United States Patent
Gula et al.

(10) Patent No.: US 7,926,113 B1
(45) Date of Patent: Apr. 12, 2011

(54) SYSTEM AND METHOD FOR MANAGING NETWORK VULNERABILITY ANALYSIS SYSTEMS

(75) Inventors: Ronald Joseph Gula, Marriotsville, MD (US); Renaud Marie Maurice Deraison, Columbia, MD (US); Matthew Todd Hayton, Silver Spring, MD (US)

(73) Assignee: Tenable Network Security, Inc., Columbia, MD (US)

( * ) Notice: Subject to any disclaimer, the term of this patent is extended or adjusted under 35 U.S.C. 154(b) by 1112 days.

(21) Appl. No.: 10/863,238

(22) Filed: Jun. 9, 2004

Related U.S. Application Data

(60) Provisional application No. 60/476,855, filed on Jun. 9, 2003.

(51) Int. Cl.
   *G06F 11/00* (2006.01)
   *G06F 12/14* (2006.01)
   *G06F 12/16* (2006.01)
   *G08B 23/00* (2006.01)

(52) U.S. Cl. ............................................ 726/25
(58) Field of Classification Search .............. 726/25
   See application file for complete search history.

(56) References Cited

U.S. PATENT DOCUMENTS

| | | | | |
|---|---|---|---|---|
| 4,525,599 A | | 6/1985 | Curran et al. | 178/22.08 |
| 5,541,997 A | | 7/1996 | Pappas et al. | 380/49 |
| 5,715,391 A | | 2/1998 | Jackson et al. | 395/200.01 |
| 5,721,819 A | | 2/1998 | Galles et al. | 395/200.15 |
| 5,838,919 A | * | 11/1998 | Schwaller et al. | 709/224 |
| 5,844,817 A | * | 12/1998 | Lobley et al. | 703/2 |
| 6,154,775 A | | 11/2000 | Coss et al. | 709/225 |
| 6,324,656 B1 | | 11/2001 | Gleichauf et al. | 714/37 |
| 6,393,568 B1 | | 5/2002 | Ranger et al. | 713/188 |
| 6,415,321 B1 | | 7/2002 | Gleichauf et al. | 709/224 |
| 6,487,666 B1 | | 11/2002 | Shanklin et al. | 713/201 |
| 6,499,107 B1 | | 12/2002 | Gleichauf et al. | 713/201 |
| 6,510,509 B1 | | 1/2003 | Chopra et al. | 712/13 |
| 6,606,663 B1 | | 8/2003 | Liao et al. | 709/229 |
| 6,704,874 B1 | | 3/2004 | Porras et al. | 713/201 |
| 6,711,127 B1 | * | 3/2004 | Gorman et al. | 370/230 |
| 6,789,202 B1 | | 9/2004 | Ko et al. | 713/201 |
| 6,873,617 B1 | | 3/2005 | Karras | 370/389 |

(Continued)

OTHER PUBLICATIONS

Wack, John, et al., "NIST Special Publication 800-42, Guideline on Network Security Testing", Computer Security Division, National Institute of Standards and Technology, Oct. 2003, pp. 1-92.

(Continued)

*Primary Examiner* — Benjamin E Lanier
*Assistant Examiner* — Cordelia Zecher
(74) *Attorney, Agent, or Firm* — Pillsbury Winthrop Shaw Pittman LLP

(57) ABSTRACT

Systems and methods to manage multiple vulnerability scanners distributed across one or more networks using a distributed security management system, herein called a Lightning Console. By distributing multiple scanners across a network, the work load of each scanner may be reduced to significantly reduce the impact on the network routing and switching infrastructure. In addition, scanners may be placed directly behind firewalls for more thorough scanning. Further, scanners may be placed closer to their scanned networks. By placing vulnerability scanners closer, the actual scanning traffic does not cross the core network switch and routing fabric, thereby avoiding potential network outages due to scanning activity. In addition, the closer distance of the scanners to the scanned targets speeds scan times by reducing the distance that the packets must traverse.

42 Claims, 15 Drawing Sheets

U.S. PATENT DOCUMENTS

| | | | |
|---|---|---|---|
| 6,882,728 B1 | 4/2005 | Takahashi et al. | 380/201 |
| 6,886,020 B1 | 4/2005 | Zahavi et al. | 707/204 |
| 6,952,779 B1 | 10/2005 | Cohen et al. | 713/200 |
| 6,957,348 B1 | 10/2005 | Flowers et al. | 713/201 |
| 6,968,377 B1 | 11/2005 | Gleichauf et al. | 709/224 |
| 7,017,186 B2 | 3/2006 | Day | 726/23 |
| 7,073,198 B1 | 7/2006 | Flowers et al. | 726/25 |
| 7,093,287 B1 | 8/2006 | Gusler et al. | 726/13 |
| 7,120,148 B1 | 10/2006 | Batz et al. | 370/392 |
| 7,134,141 B2 | 11/2006 | Crosbie et al. | 726/23 |
| 7,139,819 B1 | 11/2006 | Luo et al. | 709/223 |
| 7,162,742 B1 | 1/2007 | Flowers et al. | 726/25 |
| 7,181,769 B1 | 2/2007 | Keanini et al. | 726/23 |
| 7,237,264 B1 * | 6/2007 | Graham et al. | 726/23 |
| 7,243,366 B2 | 7/2007 | Medvinsky et al. | 726/2 |
| 7,290,145 B2 * | 10/2007 | Falkenthros | 713/182 |
| 7,324,551 B1 | 1/2008 | Stammers | 370/468 |
| 7,509,681 B2 | 3/2009 | Flowers et al. | 726/25 |
| 7,594,273 B2 | 9/2009 | Keanini et al. | 726/25 |
| 7,761,918 B2 | 7/2010 | Gula et al. | 726/23 |
| 2001/0034847 A1 | 10/2001 | Gaul, Jr. | 713/201 |
| 2002/0019945 A1 * | 2/2002 | Houston et al. | 713/201 |
| 2002/0100023 A1 | 7/2002 | Ueki et al. | 717/127 |
| 2002/0107841 A1 | 8/2002 | Hellerstein et al. | 707/3 |
| 2002/0166063 A1 | 11/2002 | Lachman, III et al. | 713/200 |
| 2003/0051026 A1 | 3/2003 | Carter et al. | 709/224 |
| 2003/0056116 A1 * | 3/2003 | Bunker et al. | 713/201 |
| 2003/0135517 A1 | 7/2003 | Kauffman | 707/103 R |
| 2003/0145225 A1 | 7/2003 | Bruton, III et al. | 713/201 |
| 2003/0196123 A1 | 10/2003 | Rowland et al. | 713/201 |
| 2004/0003266 A1 | 1/2004 | Moshir et al. | 713/191 |
| 2004/0015719 A1 | 1/2004 | Lee et al. | 713/201 |
| 2004/0042470 A1 | 3/2004 | Cooper et al. | 370/401 |
| 2005/0068928 A1 | 3/2005 | Smith et al. | 370/338 |
| 2005/0108578 A1 | 5/2005 | Tajalli et al. | 713/201 |
| 2005/0128988 A1 | 6/2005 | Simpson et al. | 370/338 |
| 2005/0188419 A1 | 8/2005 | Dadhia et al. | 726/1 |
| 2005/0203886 A1 | 9/2005 | Wong | 707/3 |
| 2005/0203921 A1 | 9/2005 | Newman et al. | 707/100 |
| 2006/0010245 A1 | 1/2006 | Carnahan | 709/231 |
| 2006/0018466 A1 | 1/2006 | Adelstein et al. | 380/46 |
| 2006/0117091 A1 | 6/2006 | Justin | 709/217 |
| 2007/0169190 A1 | 7/2007 | Kolton et al. | 726/22 |
| 2007/0277238 A1 | 11/2007 | Margalit et al. | 726/22 |
| 2008/0047009 A1 | 2/2008 | Overcash et al. | 726/23 |

OTHER PUBLICATIONS

Deraison, Renaud, et al., "Passive Vulnerability Scanning Introduction to NeVo", Revision 9, Tenable Network Security, Aug. 2003, pp. 1-13.

Deraison, Renaud, et al., "Unified Security Monitoring (USM); Real-Time Situational Awareness of Network Vulnerabilities, Events and Configurations", Revision 2, Tenable Network Security, Jan. 27, 2009, 12 pages.

Zhang, Yin, et al., "Detecting Backdoors", *Proceedings of the 9USENIX Security Symposium*, Denver, Colorado, Aug. 2000, 11 pages.

"Basic Cryptanalysis", Department of the Army, Field Manual No. 34-40-2, Sep. 13, 1990, 363 pages.

* cited by examiner

| | | | | | | |
|---|---|---|---|---|---|---|
| 09:56 | FTP:USER-ANON | 192.168.0.4 | 192.168.0.10 | YES | Battra | Dragon ↖1010 |
| 09:56 | FTP-BOUNCE:LOW-PORT | 192.168.0.4:1903 | 192.168.0.10:21 [2] | no | Battra | Dragon |
| 09:56 | FTP:USER-ANON | 192.168.0.4 | 192.168.0.10 | YES | Battra | Dragon |
| 09:56 | FTP:CWD-ROOT | 192.168.0.4:1904 | 192.168.0.10:21 [2] | no | Battra | Dragon |
| 09:56 | FTP:USER-ANON | 192.168.0.4 | 192.168.0.10 | YES | Battra | Dragon |
| 09:56 | FTP_Sensitive | 192.168.0.4:1926 | 192.168.0.10:21 [2] | no | Mothra | Bro |
| 09:56 | FTP_Sensitive | 192.168.0.4:1926 | 192.168.0.10:21 [2] | no | Mothra | Bro ↖1020 |

Figure 10

```
To: bsmith@examplecompany.com
Subject: ALERT: Attack on vulnerable system 192.168.126.50 port 79

Dear Bob Smith,

The Lightning Console has received an IDS alert which has targeted a
system that is vulnerable to the detected attack. Since the machine is
known to have a vulnerability which is exploitable, it is very likely
that this IDS event indicates a successful remote access or possible
compromise.

1110⌐Targeted system: 192.168.126.50
1120⌐IDS Event:       FINGER:ROOT
1130⌐Vulnerability:   Finger (Nessus ID: 10068)
1140⌐Network info:    192.168.126.252:2843 -> 192.168.126.50:79
1150⌐Target OS:       Unknown This message has been sent to all security managers and end users
responsible for the targeted IP address.
```

Figure 11

ADD NEW RECOMENDATION

FTP bounce scan

*Type:*
FIREWALL ▼

*Email Users:*
○ Do not Email users
◉ Email users who have this vulnerability

*New Information:*
This vulnerability indicates that any remote FTP user can use your FTP server to port scan another machine. This activity is most easily blocked by a network firewall rule which would prevent your FTP server from initiating outbound connections.

1210

Update

Figure 12

| IDS EVENT FILTERS | |
| --- | --- |
| EVENT NAME | FILTER TYPE |
| DNS:ANY-UDP | IGNORE |
| WEB-MISC http directory traversal | NO ALERTING |
| SNMP_Activity | IGNORE |

SYSTEM AND METHOD FOR MANAGING NETWORK VULNERABILITY ANALYSIS SYSTEMS

This application claims the benefit of U.S. Provisional Patent Application Ser. No. 60/476,855, filed Jun. 9, 2003, the contents of which are hereby incorporated by reference in their entirety.

BACKGROUND

1. Field of the Invention

The present invention relates generally to systems and methods for managing computer network vulnerability analysis systems. More particularly, the present invention relates to systems and methods for finding computer network security vulnerabilities, managing those vulnerabilities, and identifying intrusion detection events.

2. Background of the Invention

Current vulnerability systems typically include one active scanner to scan an entire network. The scan process may take as long as two weeks. Because of the time required to complete a scan, scans are not performed as frequently as desired to detect new or on-going system vulnerabilities. In addition, because the scans cross network switches and detect vulnerability by probing various devices and observing responses, the scans themselves may crash network devices.

Conducting an active vulnerability scan involves discovering systems that are present, services running on those systems, and discovering any vulnerabilities in the detected services. During an active vulnerability scan, the active scanner sends one or more packets and waits for a response. Limitations of bandwidth, memory and other factors make point vulnerability scanning solutions very limited in scanning large networks.

FIG. 1 is a schematic diagram of a conventional active scanning system. System 100 includes multiple routers 130, hosts or network devices 120 and a single active scanner 110.

Even in the small network of system 100, a single scanner 110 has to perform a considerable amount of work. Active scanner 110, which is placed in one network subnet, must send packets across several routers 130 and scan for various potential hosts 120 which may or may not be active. If any of routers 130 is performing firewall screening, the scan's results will be non-comprehensive, because the scan will be unable to scan behind the firewall. Thus, the scan results are often limited in their accuracy due to the scanner's inability to scan behind firewalls. Also, the acts of conducting host enumeration, operating system fingerprinting, service fingerprinting and port scanning may cause network performance impact and in some cases may cause a network device to crash.

In addition to hardware limitations in gathering the data, software limitations exist in assimilating and interpreting the voluminous amount of data produced during a scan. Notably, a network vulnerability analysis system may include firewalls, intrusion detection system (IDS) devices and vulnerability scanners. Each of these devices produces large amounts of data, formats that data in unique ways and classifies each type of attack according to its own terminology. Finding "real" threats in the data becomes a feat unto its own. Current vulnerability systems may filter particular events as "high priority" based upon the event name or some other variable, without having any knowledge of whether the event targets an actual vulnerability of the system. Thus, events of no consequence to the system may be flagged (resulting in false positives); whereas, true events may slip through the system undetected by security administrators.

Yet another problem plaguing security systems is the lack of communications between various groups. For example, an IT department may not receive (or understand) security vulnerabilities determined by a security group. Further, executives or other department heads may have no idea how secure their business unit is either standing alone or in comparison to other units in the organization. Because of this lack of communication, system administrators are unable to hold individuals accountable for network security and may be unaware of the true security of their system.

Consequently, a substantial need exists for methods and systems capable of managing vulnerability detection information by gathering large amounts of disparate data, correlating it, and organizing it in an efficient manner that is useful to computer network security administrators and executives in other departments.

BRIEF SUMMARY OF THE INVENTION

The method for detecting vulnerabilities in a network according to an embodiment of the preferred embodiment includes distributing a plurality of vulnerability scanners across a network. The scanners are used to scan the network and each scanner scans a portion of the network. The scanned results are forwarded from the vulnerability scanners to a centralized vulnerability management system where a network model that maps vulnerabilities in hosts, systems and services in the network is built.

According to another aspect of the invention, intrusion events are detected. These intrusion events are then correlated with the vulnerabilities to determine whether the intrusion events target the vulnerabilities.

According to yet another aspect of the invention, a system administrator and an executive of a business organizational unit are notified when the intrusion even correlates with any of the network vulnerability associated with the business organizational unit.

BRIEF DESCRIPTION OF THE DRAWINGS

FIG. 10 is a screenshot of a Lightning Console tool being used to display both vulnerable and not-vulnerable IDS events according to a preferred embodiment of the present invention.

FIG. 11 shows an exemplary e-mail message resulting from an attacked vulnerable system according to a preferred embodiment of the invention.

FIG. 12 shows a recommendation provided by the remediation tool in the Lightning Console according to an exemplary embodiment of the present invention.

FIG. 16 shows a list of filtered IDS events according to a preferred embodiment of the invention.

DETAILED DESCRIPTION OF THE INVENTION

Embodiments of the present invention manage multiple vulnerability scanners distributed across one or more networks using a distributed security management system, herein called a Lightning Console. By distributing multiple scanners across a network, the work load of each scanner may be reduced to significantly reduce the impact on the network routing and switching infrastructure. In addition, scanners may be placed directly behind firewalls for more thorough scanning. Further, scanners may be placed closer to their scanned networks. By placing vulnerability scanners closer, the actual scanning traffic does not cross the core network switch and routing fabric, thereby avoiding potential network outages due to scanning activity. In addition, the closer distance of the scanners to the scanned targets speeds scan times by reducing the distance that the packets must traverse.

The Lightning Console manages the security workflow, detects vulnerabilities and provides executive reporting and correlation of known vulnerabilities with intrusion detection events. For example, the Lightning Console may aggregate results from various scanners and share these results with particular administrators, as well as executives or other senior management. For example, the Lightning Console may receive millions of intrusion detection events per day from Intrusion Detection System (IDS) devices and process logs from firewalls, routers, servers and other devices with a log aggregation server. The Lightning Console may be used in large or small enterprise networks desirous of centralized security management.

In one embodiment of the invention, the Lightning Console offers its data through a web interface and can support thousands of end-users.

Figure 2:
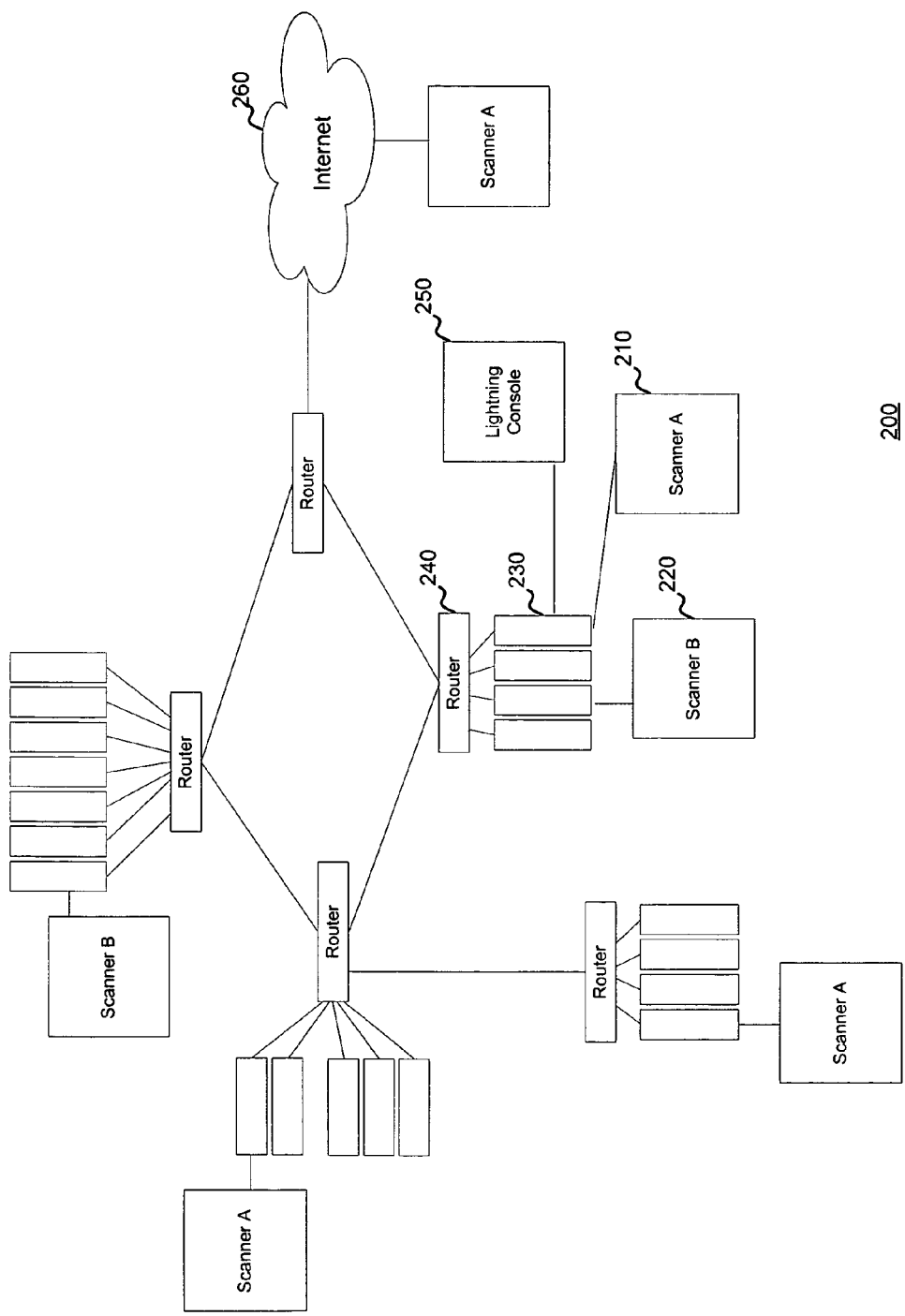
FIG. 2 is a schematic diagram of a system for providing distributed security management according to a first embodiment of the present invention.

FIG. 2 is a schematic diagram of a system for providing distributed security management according to a first embodiment of the present invention. System 200 includes a scanner A 210, a scanner B 220, a network device 230, a router 240, a Lightning Console 250 and Internet 260. Particularly, system 200 includes six scanners 210, 220, which are managed by a single Lightning Console 250. Each scanner 210, 220 is placed behind a router 240.

Figure 1:
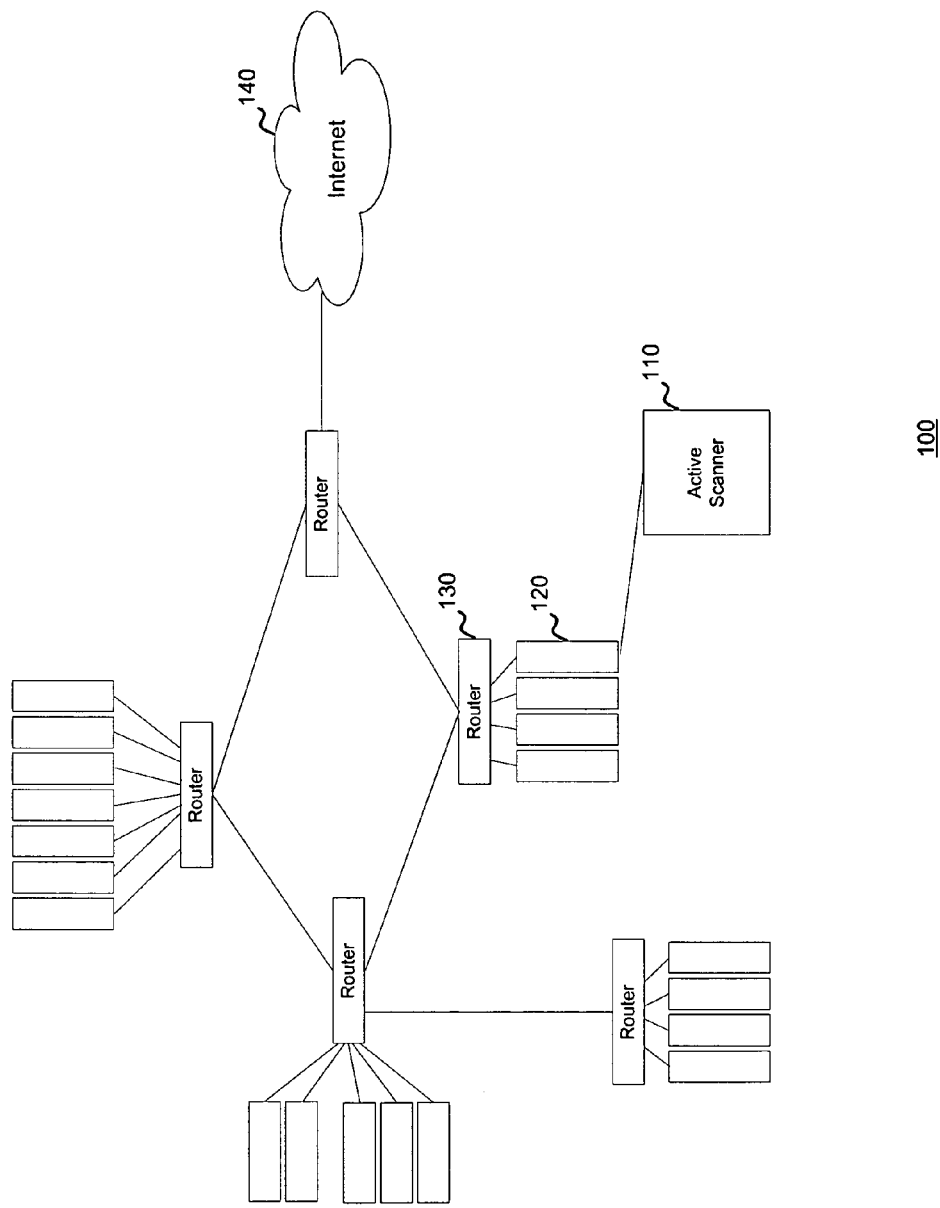
FIG. 1 is a schematic diagram of a conventional active scanning system.

Because scans and vulnerability checks do not traverse the network, scanning system 200 places less stress on the network infrastructure than scanning system 100 of FIG. 1. In addition, distributing scanners across the network provides faster scan times. Particularly, scanners 210 and 220 each scan only a portion of the network and the various scan operations performed by each of the scanners occur in parallel with one another. Because the work is divided among the scanners and performed in parallel, the scan time required by system 200 drops significantly from the scan time required by system 100 of FIG. 1. Further, because scanners 210 and 220 are distributed throughout system 200, they may be placed closer in distance to their scanned targets 230. By placing the scanners closer to the scanned targets, packets require less time to reach their targets, allowing a further reduction in scan time.

In one embodiment of the invention, scanner A 210 and scanner B 220 are active scanners of various types. Scanner A 210 and scanner B 220 may be the same or different network scanners. Active scanners A 210 and B 220 may include any active scanners that are compatible with Lightning Console 210. In a preferred embodiment of the invention, the scanners 210 and 220 comprise a piece of software loaded onto a laptop, computer system or server. For example, active scanners A 210 and B 220 may include scanners that are free to download and use (such as Nessus, available from http://www.nessus.org/download.html), scanners that are complimentary licensed, such as NeWT (available from Tenable Network Security, Columbia, Md.), or scanners that are professionally licensed, such as NeWT Pro, also available from Tenable Network Security. The scanners 210 and 220 may include standard plugins and/or the ability to create customized plugins. In a preferred embodiment, the scanners 210 and 220 use Nessus Attack Scripting Language (NASL) script language. Scanners A 210 and B 220 may operate on Windows XP, Windows 2002 and/or Unix. Nessus, for example, works on Unix-compatible systems (MacOS X, FreeBSD, Linux, Solaris and more); whereas NeWT and NeWT Pro operate on Windows 2000 and XP. NeWT may act as a Class C scanner to scan a local subnet; whereas, NeWT Pro may provide unlimited scanning.

Alternatively, or in addition thereto, in another embodiment of the invention, scanners 210 and 220 may include passive scanners, which determine actual vulnerability information based entirely upon observed network traffic. A passive scanner (described in U.S. Provisional patent application Ser. No. 60/561,515, entitled "System and Method for Scanning a Network," by Ron Gula, Renaud Deraison, and Todd Hayton, filed on Apr. 13, 2004, the contents of which are hereby incorporated by reference in their entirety) determines vulnerabilities on a network much like a sniffer. The passive scanner learns about servers, services and vulnerability by performing signature and protocol analysis of the observed network packets and sessions. For example, the passive scanner may sniff network packets on the manager's own network, compare each packet to known vulnerability signatures, and report vulnerabilities on the manager's network and remote networks to a data storage mechanism. In yet another preferred embodiment of the invention, passive vulnerability scanners are deployed in the network to fill in gaps between active scans by monitoring the network passively for new or changed vulnerabilities. Further, as described in U.S. Provisional Patent Application Ser. No. 60/561,515, which has been incorporated by reference above, the passive scanners may automatically lock onto sessions that are being tracked and ignore new sessions if the load is too high, whereby dropped packets and CPU loads may not be limiting factors in the effectiveness of the passive scanners. Moreover, as further described therein, the passive scanners may apply various signatures to information contained in observed packets, wherein the signatures may be used to recognize vulnerable service banners in the observed packets. For example, the signatures may include various patterns that can be applied to information in the observed packets (e.g., patterns that can be applied to the information in consecutive packets, binary patterns providing strings that can be applied to the information in the packets, time dependent patterns having different patterns that can be applied to the information in the packets according to certain time dependencies, etc.). Additionally, in one implementation, the passive scanners may further apply regular expressions to the observed packets in response to the information in the observed packets matching one or more of the patterns, and macros may instruct the passive scanners to store evaluations of the regular expressions further applied to the information in the packets.

Although the specification describes the vulnerability scanners herein as software modules, one of ordinary skill in the art will recognize that the scanner may also comprise a black box connected to the network.

According to a preferred embodiment of the present invention, the Lightning Console is a software module including various CGI-BIN 'C' and 'Perl' programs which run under the Apache web server and five daemons which perform communications, scheduled events, security data importing, e-mail and alerting. This installation is typically administered remotely on the command line through the use of Secure Shell (SSH). The Apache web server operates by default on port 80 without encryption, but can also be configured to operate on port 443 with SSL encryption.

The Lightning Console stores all of its customer, user, vulnerability and intrusion data into a unique, highly optimized, indexed flat file system. It does not require the use of a 'SQL' style database, such as Oracle or Sequel. Through its highly-optimized data storage, indexing and representation techniques, the Lightning Console may store vast quantities of data and quickly retrieve it. Notably, the Lightning Console includes a developed schema that stores vulnerability and intrusion detection information in only 28 bytes and 30 bytes, resulting in a vast improvement over prior art systems that typically store 500 bytes of information.

Lightning Console 250 receives a "scan request" and distributes it to various scanners A 210 and B 220. In one embodiment of the invention, Lightning Console may control up to 50 scanners. However, one of ordinary skill in the art will appreciate that the present invention is not limited to a particular number of scanners.

For example, a network having five scanners 210 and 220 may place a scan request to Lightning Console 250 requesting that each scanner perform a distributed scan.

In the above example, the network contained one zone having five scanners. However, multiple zones may be needed or used in accordance with embodiments of the present invention. Each scanner may be allocated to scan a particular zone of the network. Lightning Console 250 stores information relating to the specific zones of a particular zone.

Figure 3:
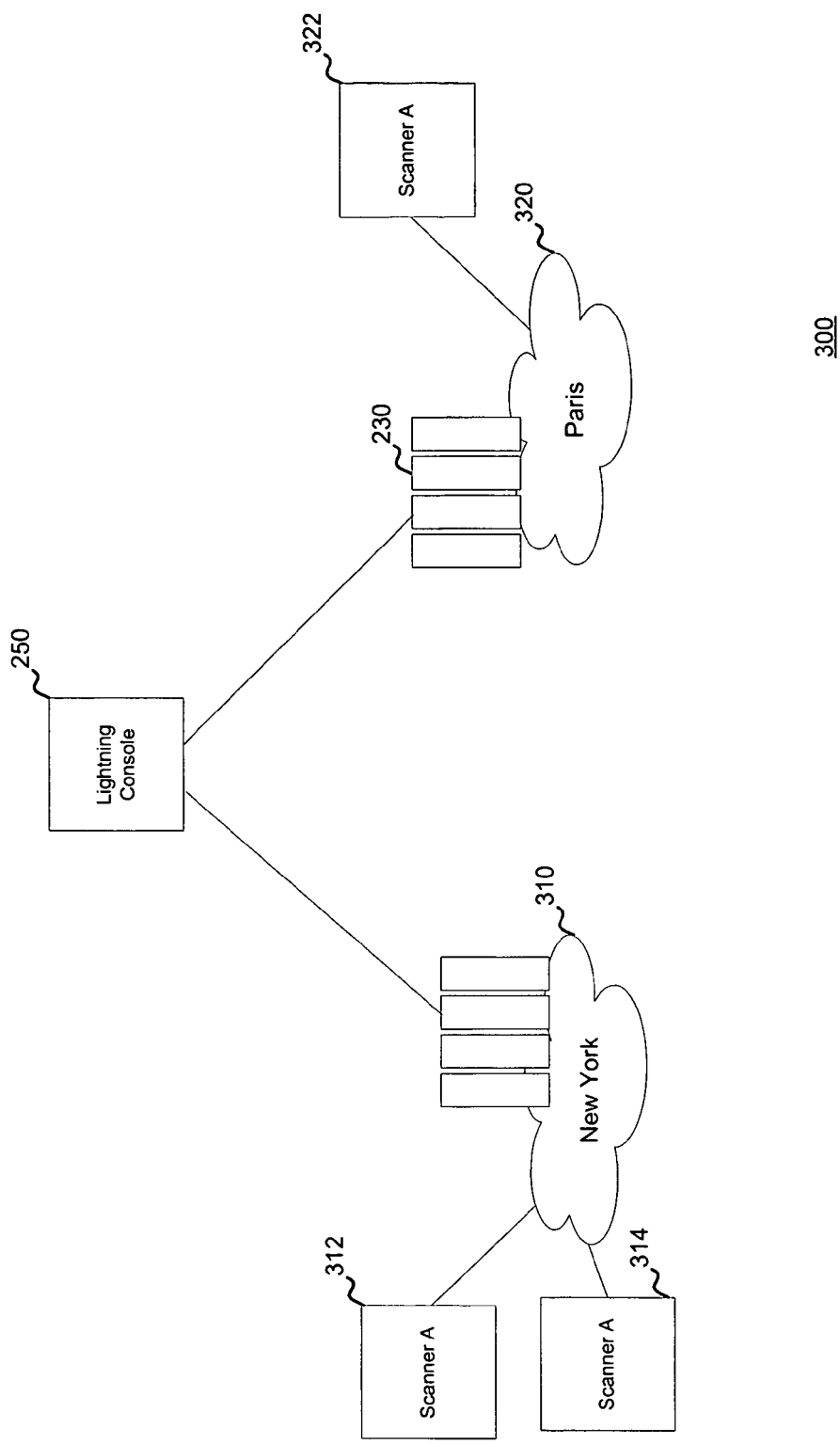
FIG. 3 illustrates a network having two zones according to a preferred embodiment of the present invention.

FIG. 3 illustrates a network 300 having two zones according to a preferred embodiment of the present invention. Network 300 includes a zone 310 in New York and a zone 320 in Paris. Zone 310 for New York has two scanners 312 and 314 attached to it, and zone 320 for Paris has one scanner 322 attached to it. Lightning Console 250 contains entries defining the IP address of zones 310 and 320, as well as the IP address and credentials to connect to each scanner 312, 314, and 322. When Lightning Console 250 receives a request to scan New York's range of networks, Lightning Console splits the scan work between scanners 312 and 314. Similarly, when Lightning Console 250 receives a request to scan Paris' network, Lightning Console sends the work solely to the single scanner 322 in zone 320.

Figure 4:
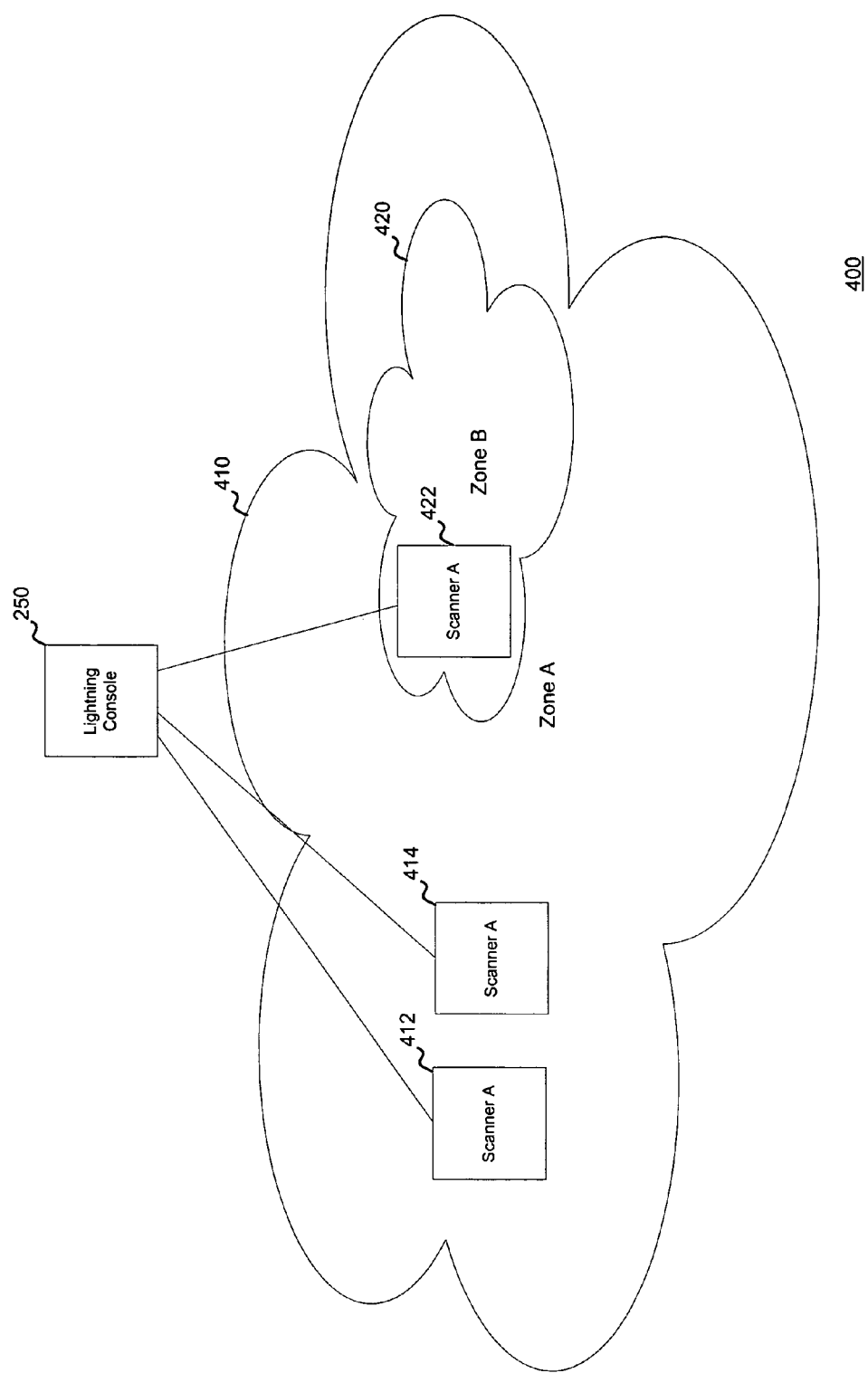
FIG. 4 illustrates a network having a zone specified in a larger zone according to a preferred embodiment of the present invention.

FIG. 4 illustrates a network 400 having a zone specified in a larger zone according to a preferred embodiment of the present invention. In system 400, Zone B 420 is contained within a larger Zone A 410. Further, scanner 422 lies within Zone B and scanners 412 and 414 are contained within the larger Zone A 410. When Lightning Console 250 receives a scan request to scan Zone B 420, Lightning Console instructs scanner 422 to scan the exclusive network. More particularly, if, for example, Zone A has a Classless Inter-Domain Routing (CIDR) block of 192.168.0.0/16 and scanners 412 and 414, and Zone B has a CIDR block of 192.168.10.0/24 and scanner 422, none of Zone A scanners would ever scan 192.168.10.0/24. Likewise, scanner 422 of Zone B 420 would not be used to scan any IP address outside the 192.168.10.0/24 network.

System 400 is very useful for large networks where some scanners are dedicated to a specific network. In FIG. 4, Zone B may be located behind a firewall (not shown). In that case, distributing the scan to external scanners 412 and 414 would be useless, because the firewall would block the vulnerability checks.

A Lightning Console administrator may add, delete and modify vulnerability scanners to the network using a graphical user interface provided by Lightning Console 250. Further, the administrator may place the scanners into zones. In one embodiment of the invention, all added scanners are initially placed into a default zone so that every scan occurs within the zone. To add a zone, an administrator may enter the IP address and listening port of the scanner, as well as a valid username and password. The administrator also may specify the starting and stopping IP addresses of various zones.

Figure 5:
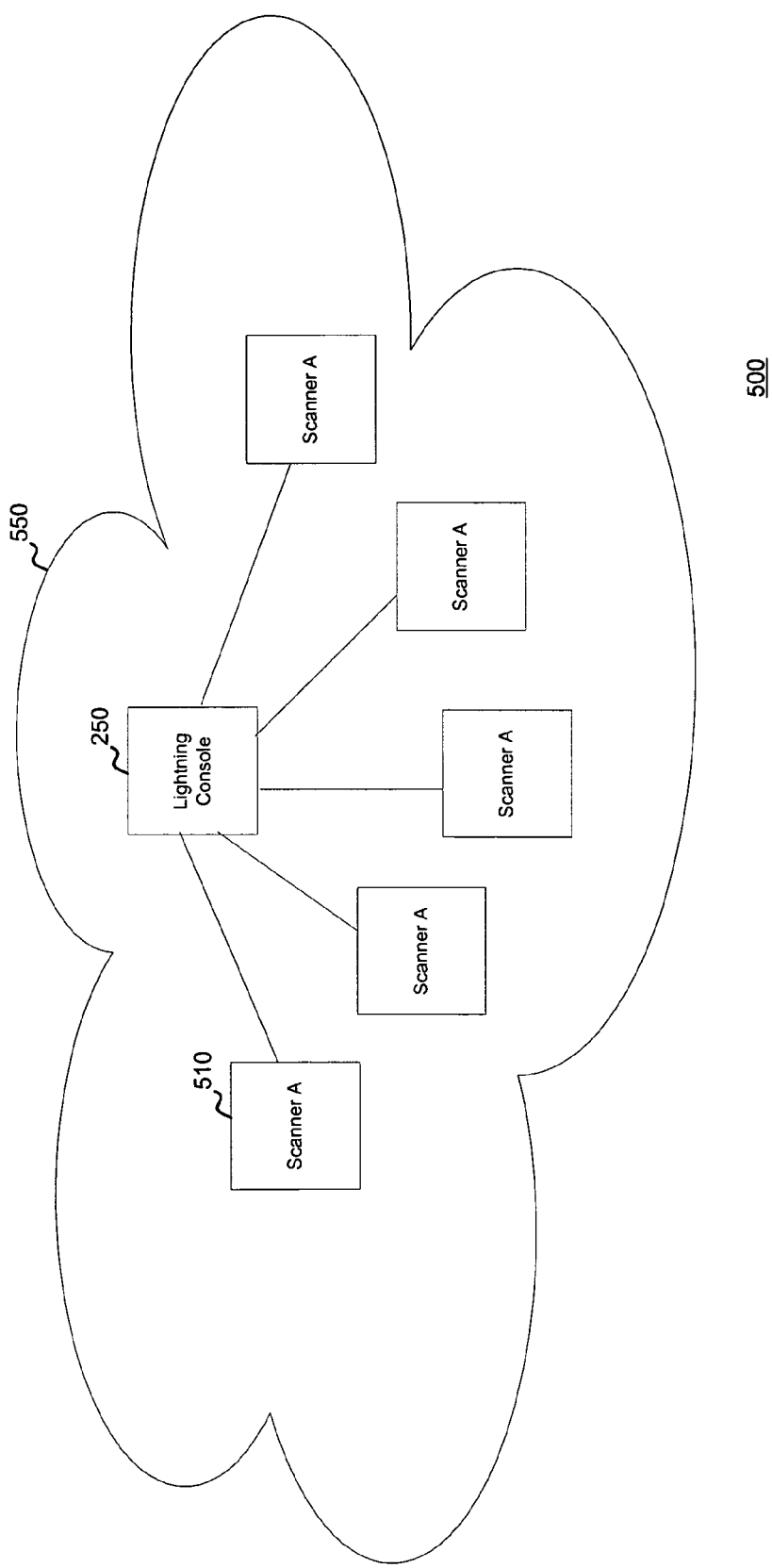
FIG. 5 shows a topology in which each scanner of a network is in a single zone according a preferred embodiment of the present invention.

FIG. 5 shows a topology in which each scanner of a network is in a single zone according a preferred embodiment of the present invention. Network 500 includes five scanners 510 placed inside of a single zone 550 defined by CIDR block 192.168.0.0/16 (not shown). Each scanner 510 in zone 550 is just as likely as the next to scan any IP address in the 192.168.0.0/16 network. The chief advantage to the topology of network 500 is raw speed. Utilizing multiple scans in parallel is a form of brute force scaling.

Figure 6:
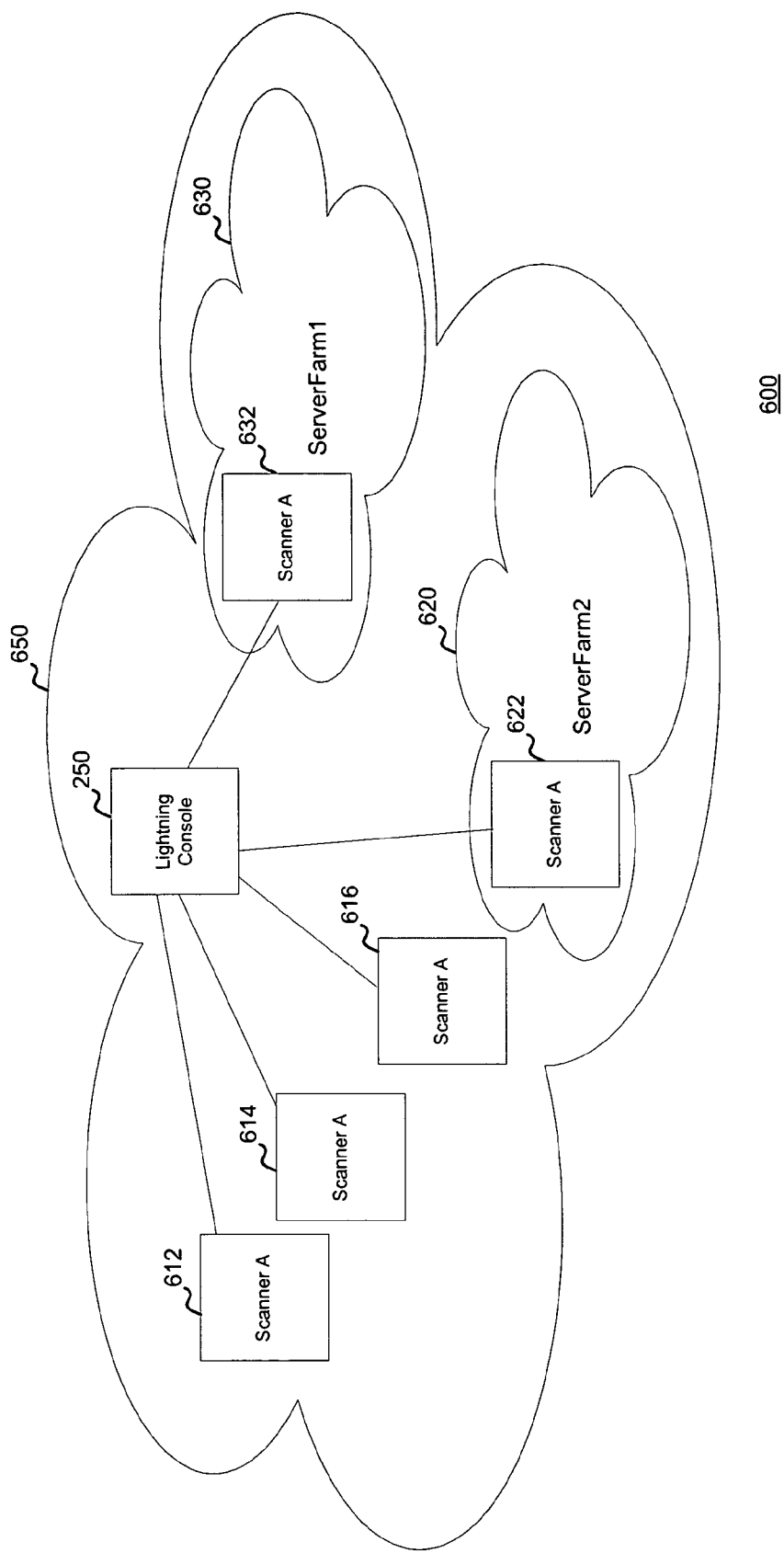
FIG. 6 shows a topology having two smaller zones contained within a larger zone according to the present invention.

FIG. 6 shows a topology having two smaller zones contained within a larger zone according to the present invention. Network 600 includes two smaller zones, ServerFarm1 630 and ServerFarm2 620, contained within a larger zone 650. ServerFarm1 630 has a scanner 632 and ServerFarm2 620 has a scanner 622. Scanners 612, 614 and 616 lie within larger zone 650 and outside of zones ServerFarm1 630 and ServerFarm2 620. In this example, when Lightning Console 250 wants to conduct a scan of an IP address in ServerFarm1 network 630, it sends scanning instructions to scanner 632 only. Similarly, if a Lightning Console administrator provides a scan request to Lightning Console 250 specifying an IP address somewhere in the 192.168.0.0/16 range and that address was not part of ServerFarm1 630 or ServerFarm2 620, any one of the three scanners 612, 614 and 616 in larger zone 650 would be chosen by Console 250 to perform the scan.

Finally, if someone requested a scan of the entire 192.168.0.0/16 address space, each scanner would exclusively scan only the ranges in their zone. Particularly, scanner 632 would scan the CIDR block of ServerFarm1 zone 630, scanner 622 would scan the zone of ServerFarm2 zone 620 and the other three scanners 612, 614 and 616 would split the remaining IP addresses in the 192.168.0.0/16 block three ways.

Lightning Console 250 also may override the default source of a scan when performing a security audit, for example. This override feature is useful for scanning remote networks to conduct internal firewall policy assessments.

Figure 7:
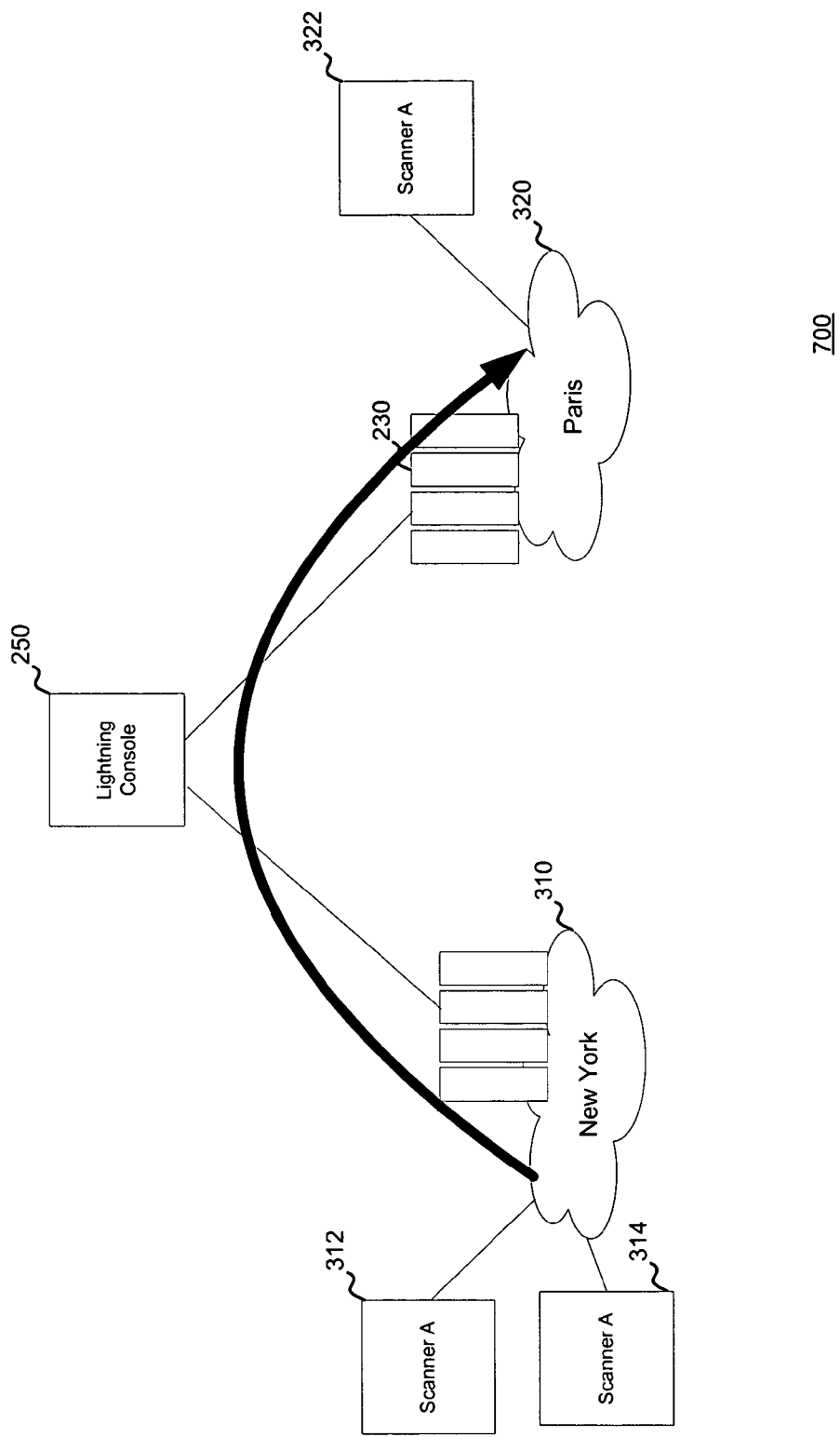
FIG. 7 provides an intra-zone scanning topology according to an embodiment of the present invention.

FIG. 7 provides an intra-zone scanning topology according to an embodiment of the present invention. Topology 700 is similar to the topology shown in FIG. 3 for the two zone network of Paris and New York. FIG. 7 differs from FIG. 3 in that Lightning Console 250 instructs scanners 312 and 314 in the New York Zone 310 to scan the CIDR blocks of a remote network in the Paris Zone 320. Normally, Lightning Console 250 distributes target IP addresses to scanners best suited for the scanning based upon its zone association. However, Lightning Console 250 may override this functionality and instruct a specific zone and its associated scanners to perform a scan of any target address space.

Figure 8:
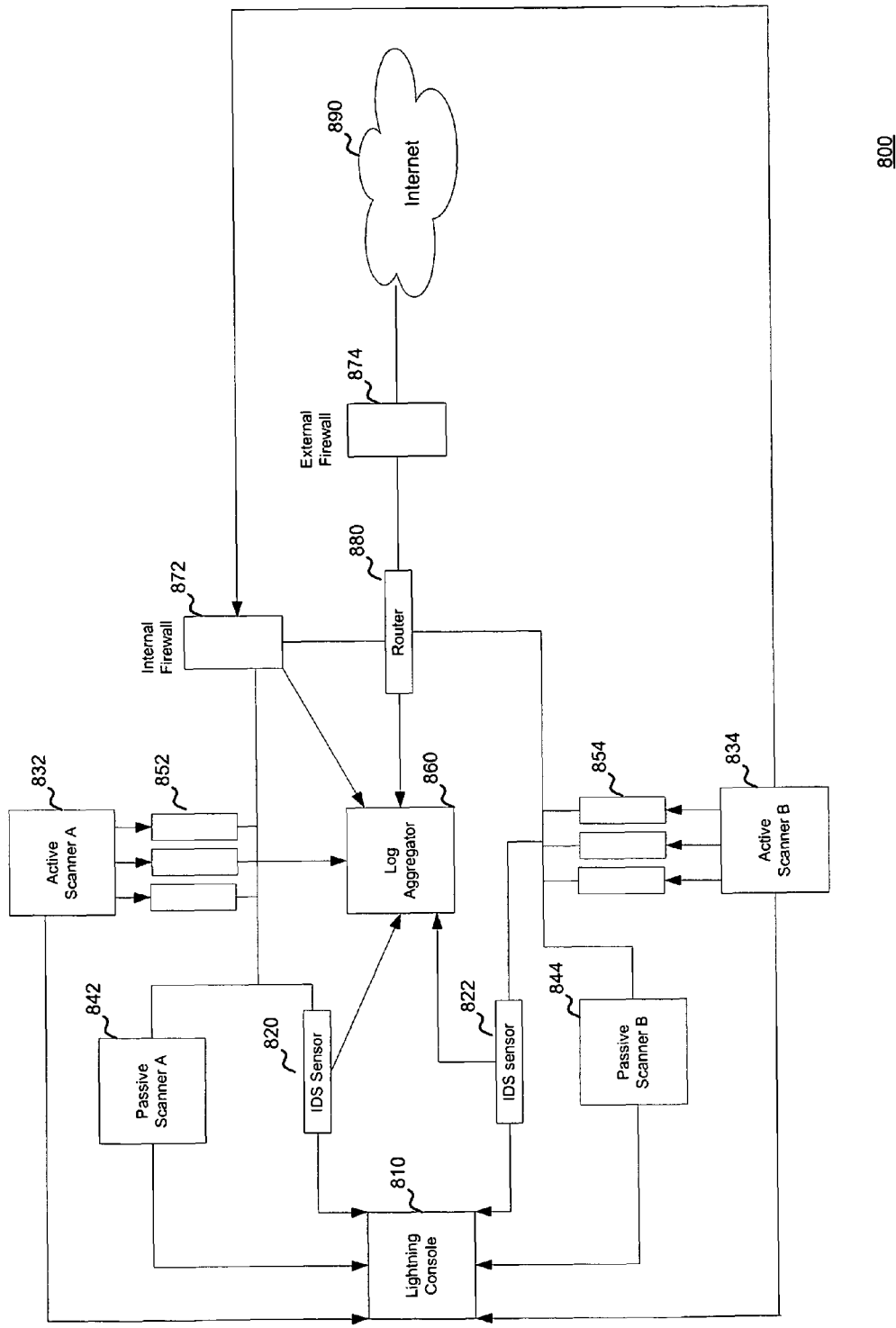
FIG. 8 shows a managed security service system for providing a variety of security functions according to a preferred embodiment of the invention.

FIG. 8 shows a managed security service system for providing a variety of security functions according to a preferred embodiment of the invention. Managed security system 800 includes Lightning Console 810, IDS sensors 820 and 822, active scanners A 832 and B 834, passive scanners A 842 and B 844, network devices 852 and 854, log aggregator 860, internal firewall 872, external firewall 874, router 880 and network 890.

FIG. 8 illustrates more clearly how Lightning Console 810 helps a security group organize, distribute, manage and report network security information to multiple users across multiple organizations and to articulate the detected and directed activity to executive management.

Lightning Console 810 scans network devices 852 and 854 using active scanners A 832 and B 834 and passive scanners A 842 and B 844. Active scanners A 832 and B 834 are preferably placed outside internal firewall 872; whereas, passive scanners A 842 and B 844 are placed within internal firewall 872. In this manner, the passive scanners may provide 24-7 passive scanning within the network to fill any gaps between active scans without impacting the system or otherwise compromising network stability. Further, by using different scanners (e.g., active and passive) and placing the scanners at different points in the network, the Lightning Console 810 may gain a more complete picture of the network and its vulnerabilities.

Internal firewall 872 and external firewall 874 may include any suitable firewall. External firewall 874 protects computer systems from outside invasions by Internet 890, for example. Internal firewall 872 may be used to protect or insulate network devices 852 and 854, which may be located in different zones, for example.

Figure 9:
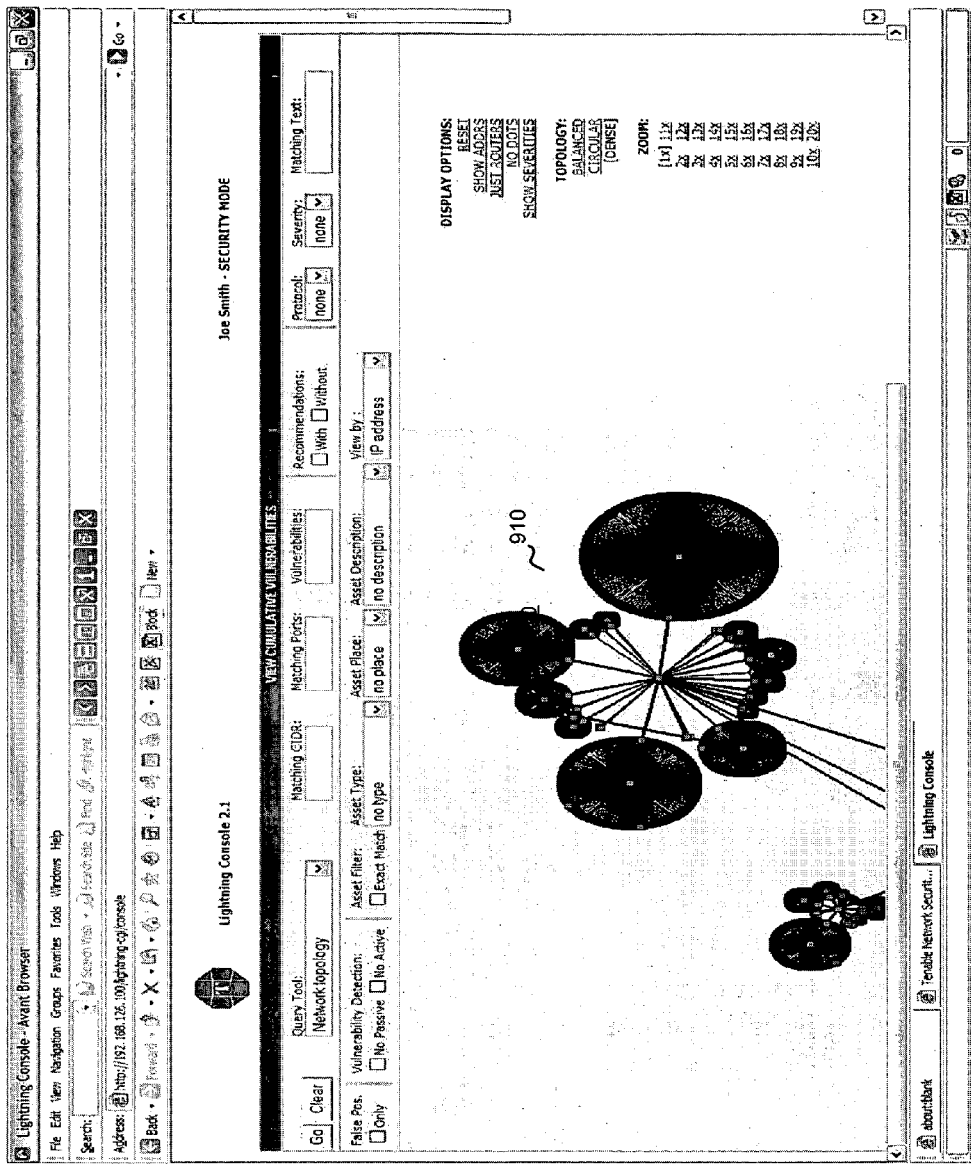
FIG. 9 shows an exemplary network topology created by Lightning Console with network scans according to a preferred embodiment of the present invention.

As Lightning Console 810 conducts its scans, it builds a model of the entire network. For example, Lightning Console 810 may create a network topology and note servers having particular vulnerabilities. FIG. 9 shows an exemplary network topology 910 created by Lightning Console 810 with network scans according to a preferred embodiment of the present invention. A vulnerability log of the known vulnerabilities is stored by Lightning Console 810.

Once the model is built, it may be used for correlation with incoming, real-time intrusion events detected by Intrusion Detection System (IDS) sensors 820 and 822. IDS sensors 820 and 822 detect intrusion events that have managed to invade the network. These events, which may be countless, are logged by log aggregator 860. In this way, log aggregator 860 stores generic security events from firewalls, intrusion sensors, routers, etc. In addition, Lightning Console also may store the intrusion events, so that it contains a record of both the vulnerabilities and the intrusion events.

In a preferred embodiment of the invention, the Lightning Console supports SYSLOG and SNMP trap analysis of IDS events from Snort (http://www.snort.org), ISS RealSecure (http://www.iss.net), Enterasys Dragon (http://www.enterasys.com) and the Bro IDS (http://www.icir org/vern/bro.html). These IDS solutions need to be configured to send SNMP or SYSLOG events directly to the Lightning Console. For IDS signature date, the Lightning Console is configured to directly access the Internet or support sites of these supported solutions. Providing direct access to Internet support sites allows the Console to build a current reference model for all the signature events checked by the Console for the IDSs being monitored.

Log aggregator 860 provides security event management and real-time analysis and normalization. Particularly, in the embodiment depicted in FIG. 8, log aggregator 860 receives data from IDS sensors 820 and 822, network devices 852, internal firewall 872, and router 880. Although the embodiment of FIG. 8 depicts log aggregator 860 as receiving data from a subset of network devices, one of ordinary skill in the art will recognize that log aggregator 860 is not limited to such an arrangement. For example, log aggregator 860 may receive data from all network devices or from any other variation of selected network devices.

Log aggregator 860 then normalizes the data and analysis it in real-time. In one embodiment, log aggregator may provide the data as a function of the number of events over time. Spikes in the number of events may indicate a problem in security, for example. In a preferred embodiment, log aggregator 860 supports hundreds of devices.

Lightning Console 810 may correlate the intrusion events detected by IDS sensors 820 and 822 with the known vulnerabilities of the system mapped during scanning operations. In this manner, the Lightning Console may correlate attacks which target network hosts or devices with the actual vulnerabilities on that host or device to define a high priority event. A high priority event includes any IDS event or intrusion which target that is vulnerable to the attack. At a simplistic level, it would make sense to ignore UNIX attacks that were targeted against a Windows 2000 machine and vice versa. On a tactical level, if the Lightning Console can correlate a specific IDS event with a specific existing vulnerability, that IDS event is flagged as a vulnerable event. There is no guarantee that the attack will succeed, and there is no guarantee that 100% of all IDS events can be correlated with a vulnerability, but the correlation helps to identify high priority events.

In a preferred embodiment, the correlation is done by matching CVE (http://cve.mitre.org) and Bugtraq (http://www.securityfocus.com) IDs with plugin information from the vulnerability scanners, allowing for a high-speed vulnerability correlation process. Rather than simply using dictionary look-ups for performing the correlations, in another preferred embodiment of the present invention, Bayesian pattern matching may be used to increase the correlation of IDS events with vulnerabilities.

FIG. 10 is a screenshot of a Lightning Console tool being used to display both vulnerable and not-vulnerable IDS events according to a preferred embodiment of the present invention. IDS Event 1010 is highlighted to indicate that it targets an active vulnerability. The "Dragon" network IDS device (NIDS) generated the event during an anonymous FTP session. The event name 'FTP:USER-ANON" has been correlated by the Lightning Console to a specific scanner vulnerability on the system at "192.168.0.10."

Similarly, FTP related IDS event 1020 is not highlighted to indicate that the event is not correlated by Lightning Console 810. In this case, the total number of active vulnerabilities is presented by the "[2]" in this chart. Clicking on this number in the Lightning Console tool, would bring the user to a list of all vulnerabilities for that IP address.

In a preferred embodiment of the invention, a simple 'one click' web filter allows all IDS events which have targeted a specific network vulnerability to be viewed and detailed in a report. According to another aspect of the invention, if an intrusion event targets a known vulnerability of the attacked system, the security group and the IT group are notified. The logs of intrusion detection events may be viewed by the IT group via the Lightning Console with commentary from the security group, thereby providing an increased threat awareness to IT. Accordingly, the IT group may be better equipped to eliminate certain vulnerabilities that are being exploited, for example.

In a preferred embodiment of the invention, the Lightning Console will email security managers and end users when their vulnerable systems are attacked. If a host that is under a security manager's management is vulnerable to a specific attack and an IDS observes the corresponding attack, the Console will email any security managers and end users responsible for the system.

FIG. 11 shows an exemplary e-mail message due to an attacked vulnerable system according to a preferred embodiment of the invention. The e-mail indicates that the Lightning Console has received an IDS alert which has targeted a system that is vulnerable to the detected attack and may indicate a successful remote access or possible compromise. The e-mail further includes pertinent information, such as an IP address of the Targeted system 1110 (e.g., 192.168.126.50), the name of the IDS event 1120 (e.g., FINGER ROOT), the vulnerability 1130 being exploited Finger (Nessus ID: 10068), the network information 1140 (e.g., 192.168.126.252: 2843->192.168.126.50:79), and the target operating system 1150 (e.g., "unknown").

Thus, by correlating intrusion detection system (IDS) events from each sensor having a known vulnerability, the Lightning Console achieves greater accuracy in identifying alarms. Further, sending events to administrators and executives, IT administrators may view alarms with more accuracy and executives may hold security groups and IT accountable for secured network. Rather than constantly tuning each IDS sensor so that only "high priority" events are sent to a Network Operations Center (NOC), the Lightning Console correlates an IDS event with a known vulnerability. The IDS event is configured for transmission to a NOC and to a security group. Thus, rather than requiring the NOC to be cognizant of each different IDS event, administrators and executives now receive one alert which basically says, "A server has been attacked, and it is vulnerable to the attack." From the NOC's point of view, alarms may be considered with more accuracy. In addition, Lightning Console 250 provides an integrated place to view all IDS events for any further investigation.

The Lightning Console provides various tools for manipulating and managing vulnerability information. Some tools include a remediation tool, a tool for browsing cumulative vulnerabilities, a tool for browsing missing or patched vulnerabilities, a tool for browsing scans, a tool for creating vulnerability reports, a tool for viewing vulnerability reports, a vulnerability trending tool, an analyze events tool, and a filter IDS events tool. Each of the tools produce various graphical user interfaces for convenient and user-friendly implementation. In a preferred embodiment of the invention, a user may select various output screens for inclusion in an executive report.

The remediation tool provided by Lightning Console allows a system administrator to mitigate security vulnerabilities. For example, the Lightning Console allows a security group to tag each detected vulnerability with a recommendation. FIG. 12 shows a recommendation 1210 provided by the remediation tool in the Lightning Console according to an exemplary embodiment of the present invention. Here, the recommendation advises how to mitigate the vulnerability. However, the information contained in the recommendation may include any message that the security group deems important for the local network environment and threat condition. It is intended to be consumed by network and system engineers whose job it may be to mitigate these vulnerabilities. Exemplary forms of information distributed by the recommendation is provided below:

vulnerabilities that should be mitigated as specified by a corporate security policy;

directives by the CIO or CSO that state the priority of security vulnerabilities to be mitigated;

threat information from attacks against the organization exploiting the vulnerability;

guidance on determining the validity of a detected vulnerability;

guidance on mitigating, removing or patching a detected vulnerability;

blocking a vulnerability with a host firewall or network firewall;

For example, some communication examples for increasing the dialogue between the security groups and the IT or network engineering groups of an organization: (1) indicating that a vulnerability is more critical than others, (2) indicating that a vulnerability is being actively exploited on the Internet, or even on the local organization's network, (3) distributing testing information of patches and upgrades, (4) indicating direct guidance from the CIO or CSO, (5) indicating how their response will be measured (i.e. 'all systems not patched by Friday'), (6) offering help to secure machines or to show how to secure machines, and (7) pointing system administrator's to the security group's own web site which contains additional remediation information.

In response to the recommendation, end users of the Lightning Console input remedial actions taken to secure the vulnerable systems using a tool for browsing missing or patched vulnerabilities. Using this tool, the remedial information is stored by the Lightning Console for subsequent review. When vulnerabilities are no longer present, they are removed from the 'Cumulative' index and placed into the 'Missing/Patched' index associated with the tool from the tool for browsing missing or patched vulnerabilities. A vulnerability is no longer active when it is tested against a system and is not available because the system is not present, or because the vulnerability is no longer there.

For example, if there was an Apache 1.2 vulnerability and someone upgraded the server to Apache 2.0, then the vulnerability would most likely be removed. The vulnerability would be moved to the 'Missing/Patched' index. In a preferred embodiment of the invention, the vulnerability would also contain recommendation and remediation information so that subsequent users may view who upgraded the system to Apache 2.0 and when the upgraded was performed.

The Lightning Console also includes a tool for browsing cumulative vulnerabilities. The 'Browse Cumulative Vulnerabilities' interface tool includes several tools to drill down through the data. In a preferred embodiment of the invention, the actual data is also hyper-linked such that clicking at various points will take the user to new information in a drill-down manner.

Figure 13:
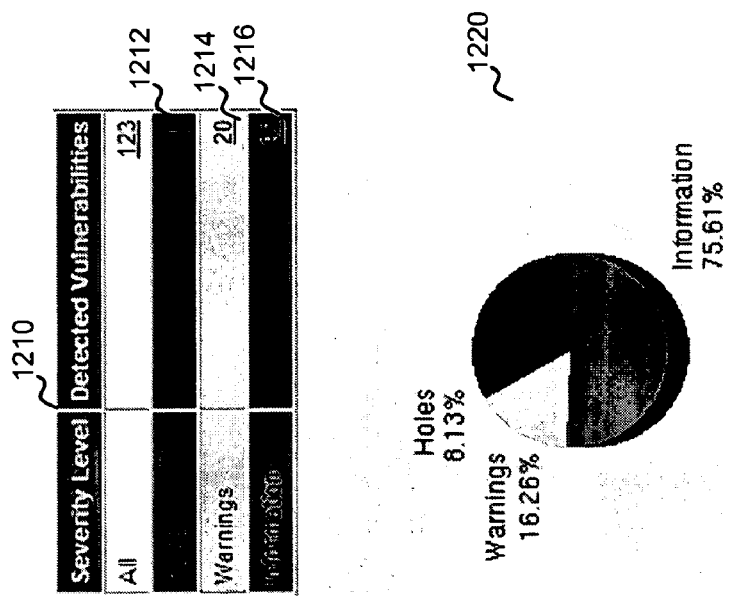
FIG. 13 shows a Lightning Console display for browsing cumulative vulnerabilities according to a preferred embodiment of the present invention.

FIG. 13 shows a Lightning Console display for browsing cumulative vulnerabilities according to a preferred embodiment of the present invention. The Lightning Console keeps track of all available systems, and their most recent results of a vulnerability scan. If a scan occurs, its results are immediately added to the index regardless of the scan target, how often the scan occurs or the vulnerability policy used. The Lightning Console allows any user to scan at any time they wish while also providing one common place for the scan results to be located.

The cumulative vulnerabilities may be displayed as a table 1210 and summary 1220 of all vulnerabilities. All vulnerabilities are classified as informational 1216, as warnings 1214 or as holes 1212. Informational vulnerabilities 1216 include detected open ports, types of operating systems and running RPC services. A warning 1214 is a security vulnerability which may be used to compromise a system, but is not trivial to compromise. In some cases, a security vulnerability may be labeled as a warning, because the information obtained from the exploit is of little value. The last category of vulnerabilities are holes 1212. Holes 1212 are easily exploitable and represent significant risk to the system of remote compromise.

The Browse Scan Results tool allows scans to be viewed individually, rather than cumulatively. That is, because scans occur independent of the cumulative index, a difference of information can be derived with a focus on 'new' information. For each scan, any vulnerability information which is not already in the cumulative index is tagged as 'new' and copied into a separate logical grouping of vulnerabilities. In this way, a user may go back through each scan and discover what information the scan provided. In addition, the user may review the scans to see how the network changes over time using the Browse Scan Results Tool.

The Create Vulnerability Report tool generates vulnerability reports of the detected vulnerabilities. In one embodiment of the invention, the reports are generated in PDF format. The report may include a report title, an additional CIDR filter and a source of vulnerability data. According to one aspect of the present invention, a user generates a report on unique IP addresses or networks using a CIDR filter. However, in an alternative embodiment, the report may contain information on the entire set of vulnerabilities for the user. The report may include vulnerability information from the entire cumulative index. Alternatively, the report may be customized for a particular scan that is saved in the Lightning Console.

In one embodiment of the invention, the report contains a plethora of information such as active operating systems, vulnerabilities, open ports, active systems and many other pieces of information. However, in a preferred embodiment of the invention, the Console allows a user to tailor the information generated in the report.

A user may view the generated report using a View Vulnerability Report tool. Any generated reports can be downloaded or deleted using the View Vulnerability Report tool. The list of reports includes the name of the report, the report type, the active CIDR blocks, the date of the report generation and the size of the actual report in bytes.

The "Filter/Mark False Positive" tool allows security managers to eliminate a vulnerability on a particular system from appearing in reports, correlating with IDS logs or alarming end-users. The security manager accomplishes this task by reviewing detected vulnerabilities and selecting particular ones to filter.

In a preferred embodiment, the security manager clicks on a "Filter/Mark False Positive" link to remove a vulnerability on the system. Once selected and confirmed, the vulnerability will be hidden from end-users and other security managers within two to three minutes. According to an aspect of the present invention, a link on the security manager's home page allows the security manager to un-hide a hidden vulnerability.

Further, another link allows a security manager to view all of their CIDR blocks that have end systems with hidden vulnerabilities. From there, they can drill down into the actual list of vulnerabilities and choose to un-hide ones if needed.

Figures 14, 15:
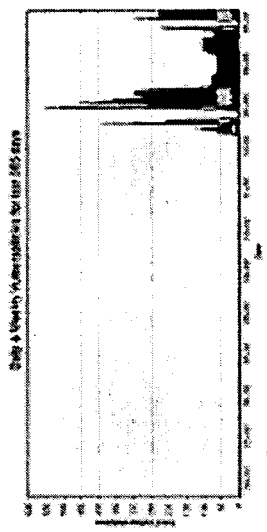
FIG. 14 shows a graph of vulnerabilities over a period of time according to a preferred embodiment of the present invention.
FIG. 15 shows results of vulnerability scoring according to a preferred embodiment of the present invention.

The Vulnerability Trend tool allows users to trend the total numbers of vulnerabilities over time. FIG. 14 shows a graph of vulnerabilities over a period of time according to a preferred embodiment of the present invention. The ability to graph vulnerabilities on a daily basis is useful for noticing trends. The Lightning Console produces graphs of vulnerabilities by searching through archived scans and deriving the required information. Because each scan is stored in a binary index, the overall time it takes to do a query is not very long. However, the overall time to build a trending graph requires more time that typical queries due to the large number of small indices that must be searched. Custom queries are also supported such that a user could build a trend of just one vulnerability, one port, one protocol, etc.

To build the information required for trending graphs, it is necessary to scan each day, or each week with an automated scan. Only automated daily or weekly scans are used to build the trending graphs. Monthly scans are used to build twelve month trending graphs.

The Vulnerability Scoring Tool assigns weights to vulnerabilities discovered by the scanners. For example, a default or customized weight may be assigned to informational, warnings and holes that are discovered by the active or passive scanner. In one embodiment of the invention, a default score value is one point for an informational vulnerability, three points for a warning and ten points for an actual hole. These weights can be modified for each customer within the Lightning Console. When an end-user or security manager views vulnerability information about CIDR blocks or specific IP addresses, the aggregate score from all vulnerabilities is displayed.

FIG. 15 shows results of a vulnerability scoring according to a preferred embodiment of the present invention. Entry 1510 illustrates that at IP address 198.168.126.100, there are 7 holes, 5 warnings and 22 information events, thereby generating a score of 1870. This score, which is the highest score shown in FIG. 15, indicates that IP address 198.168.126.100 is a much greater security risk than the other IP addresses listed.

If the Lightning Console has been configured to receive IDS event information, an IDS Event tool is used to analyze those events and manage the sources of those events. Similarly, the Analyze Events tool, presents a user with a summary of all IDS events which have occurred on the most recent day of activity, which is usually the current day. In one embodiment of the present invention, the tool may list each unique IDS event type, the total number of IDS events, the sensor type for the detected event and the time the events occurred. For example, an IDS events tool may show that on a given day, four unique event types occurred from a Bro intrusion detection source between 1:00 a.m. and 2:00 a.m.

The Analyze Events tool also identifies high priority IDS events, as described above. Notably, the Analyze Events tool allows a user to define a high priority event as any IDS event which targets a system that is vulnerable to the attack.

Similar to the Browse Missing or Patched Vulnerabilities tool, the Filter IDS Events tool allows for complete filtering (e.g., ignoring) of any unique IDS event such that it is as if the IDS never sent the event in the first place. The Console also allows for IDS alerts to be logged, but ensures that no action is taken based on the alert. FIG. 16 shows a list of filtered IDS events according to a preferred embodiment of the invention.

In IDS event "DNS:ANY-UDP" 1610 the alert is completely ignored, and does not appear in any display on the Lightning Console. In contrast, in event "WEB-MISC" 1620, the event would appear on the Lightning Console, but would not be used or processed to produce any alarms in any vulnerability correlation.

In addition, the Filter IDS events tool may filter IDS events based on the source IP address of the originating event. For example, entering the IP address of a particular vulnerability scanner into the filter would cause all of the IDS events generated by the vulnerability scanner to be ignored. An IP address filter operates across all IDS sources. That is, if a specific IP address is ignored, no events from that IDS source may be viewed.

A "Force IDS Signature Update" tool allows a security manager to force the Lightning Console to perform an update of any of the information sources for vulnerabilities or IDS signatures. Implementing this tool causes the Console to retrieve the latest security information and use the retrieved information immediately.

In summary, the Console of the present invention has many powerful features which include extremely robust vulnerability scanning; reporting and scheduling; asset management; real time aggregation of IDS events and correlation with vulnerabilities; tracking the network security remediation process; strong separation of roles and security information; and organizational view of network security.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for detecting one or more vulnerabilities in a network, comprising:
    distributing a plurality of active vulnerability scanners on a network having a plurality of zones defined in one or more inputs to a graphical user interface, wherein the one or more inputs to the graphical user interface place a first subset of the plurality of active vulnerability scanners in a first one of the plurality of zones, and wherein the one or more inputs to the graphical user interface further place a second subset of the plurality of active vulnerability scanners in a second one of the plurality of zones;
    scanning the plurality of zones in the network with the plurality of active vulnerability scanners, wherein scanning the plurality of zones in the network with the plurality of active vulnerability scanners includes:
        actively scanning the first zone in the network with the first subset of the plurality of active vulnerability scanners, wherein scanning the first zone in the network with the first subset of the plurality of active vulnerability scanners includes the first subset of the plurality of active vulnerability scanners sending packets to one or more network components in the first zone, observing responses to the packets from the one or more network components, and detecting one or more vulnerabilities in the first zone from the observed responses; and
        actively scanning the second zone in the network with the second subset of the plurality of active vulnerability scanners, wherein scanning the second zone in the network with the second subset of the plurality of active vulnerability scanners includes the second subset of the plurality of active vulnerability scanners sending packets to one or more network components in the second zone, observing responses to the packets from the one or more network components, and detecting one or more vulnerabilities in the second zone from the observed responses;
    forwarding results from scanning the plurality of zones in the network with the plurality of active vulnerability scanners to a vulnerability management system, wherein the scanning results forwarded from the plurality of active vulnerability scanners include information describing the one or more vulnerabilities detected in the first zone and the one or more vulnerabilities detected in the second zone;
    building a model of the network from the scanning results forwarded to the vulnerability management system, wherein the model of the network maps the one or more vulnerabilities detected in the first zone and the one or more vulnerabilities detected in the second zone;
    sniffing, with one or more passive vulnerability scanners further distributed on the network, a plurality of packets observed in traffic traveling across the network, wherein the one or more passive vulnerability scanners detect an intrusion event in the network from information in the plurality of sniffed packets, and wherein sniffing the plurality of packets with the one or more passive vulnerability scanners includes the one or more passive vulnerability scanners ignoring one or more sessions newly observed on the network in response to the one or more passive vulnerability scanners having a high load; and
    correlating the detected intrusion event with the one or more vulnerabilities detected in the first zone and the one or more vulnerabilities detected in the second zone to determine whether the detected intrusion event targets any of the vulnerabilities detected in the first zone or the second zone.

2. The method of claim 1, wherein the one or more inputs to the graphical user interface place one or more of the first subset of the plurality of active vulnerability scanners or the second subset of the plurality of active vulnerability scanners behind a firewall in the network to scan one or more targets located behind the firewall.

3. The method of claim 1, wherein the vulnerability management system correlates the detected intrusion event with the one or more vulnerabilities detected in the first zone and the one or more vulnerabilities detected in the second zone using Bayesian pattern matching.

4. The method of claim 1, further comprising transmitting an electronic message to at least one entity in the network in response to determining that the detected intrusion event targets any of the vulnerabilities detected in the first zone or the second zone.

5. The method of claim 1, further comprising:
receiving an indication that at least one of the vulnerabilities detected in the first zone or the second zone have been removed; and
updating the model of the network to remove the at least one vulnerability in response to receiving the indication that the at least one vulnerability has been removed.

6. The method of claim 5, wherein the indication includes information describing an action taken to remove the at least one vulnerability.

7. The method of claim 5, further comprising transmitting an electronic message to at least one entity in the network, wherein the electronic message includes information describing a recommendation for removing or mitigating the at least one vulnerability.

8. The method of claim 1, wherein scanning the plurality of zones in the network with the plurality of active vulnerability scanners further includes the first subset of the plurality of active vulnerability scanners discovering one or more systems present in the first zone from the observed responses and the second subset of the plurality of active vulnerability scanners discovering one or more systems present in the second zone from the observed responses.

9. The method of claim 8, wherein scanning the plurality of zones in the network with the plurality of active vulnerability scanners further includes the first subset of the plurality of active vulnerability scanners discovering one or more services running on the systems discovered in the first zone from the observed responses and the second subset of the plurality of active vulnerability scanners discovering one or more services running on the systems discovered in the second zone from the observed responses.

10. The method of claim 9, wherein at least one of the vulnerabilities detected in the first zone or the vulnerabilities detected in the second zone comprises a vulnerability associated with one or more of the services discovered in the first zone or the services discovered in the second zone.

11. The method of claim 1, wherein one or more of the first subset of the plurality of active vulnerability scanners or the second subset of the plurality of active vulnerability scanners are distributed outside a firewall in the network to scan one or more targets located outside the firewall.

12. The method of claim 1, wherein the first subset of the plurality of active vulnerability scanners and the second subset of the plurality of active vulnerability scanners are distributed outside a firewall in the network to scan targets located outside the firewall, and wherein the one or more passive vulnerability scanners are distributed inside the firewall to sniff the plurality of packets inside the network.

13. The method of claim 1, wherein the model of the network assigns weights to the one or more vulnerabilities detected in the first zone and further assigns weights to the one or more vulnerabilities detected in the second zone.

14. The method of claim 13, wherein the weights include one point for any of the detected vulnerabilities that are informational, three points for any of the detected vulnerabilities that are warnings, and ten points for any of the detected vulnerabilities that are actual holes.

15. A system for detecting vulnerabilities in a network, comprising:
a network having a plurality of zones, wherein one or more inputs to a graphical user interface define the plurality of zones in the network;
a first set of active vulnerability scanners distributed in a first one of the plurality of zones in the network, wherein the one or more inputs to the graphical user interface place the first set of active vulnerability scanners in the first zone, and wherein the first set of active vulnerability scanners are configured to send packets to one or more network components in the first zone to actively scan the first zone, observe responses to the packets from the one or more network components in the first zone, and detect one or more vulnerabilities in the first zone from the observed responses;
a second set of active vulnerability scanners distributed in a second one of the plurality of zones in the network, wherein the one or more inputs to the graphical user interface further place the second set of active vulnerability scanners in the second zone, and wherein the second set of active vulnerability scanners are configured to send packets to one or more network components in the second zone to actively scan the second zone, observe responses to the packets from the one or more network components in the second zone, and detect one or more vulnerabilities in the second zone from the observed responses;
one or more passive vulnerability scanners configured to:
sniff a plurality of packets observed in traffic traveling across the network;
detect an intrusion event in the network from the information in the plurality of sniffed packets; and
ignore one or more sessions newly observed on the network in response to the one or more passive vulnerability scanners having a high load
a vulnerability management system, including a processor, that receives results from the first set of active vulnerability scanners scanning the first zone and the second set of active vulnerability scanners scanning the second zone, wherein the scanning results received from the first set of active vulnerability scanners and the second set of active vulnerability scanners include information describing the one or more vulnerabilities detected in the first zone and the one or more vulnerabilities detected in the second zone, and wherein the vulnerability management system is configured to:
build a model of the network from the scanning results received at the vulnerability management system, wherein the model of the network maps the one or more vulnerabilities detected in the first zone and the one or more vulnerabilities detected in the second zone; and
correlate the detected intrusion event with the one or more vulnerabilities detected in the first zone and the one or more vulnerabilities detected in the second zone to determine whether the detected intrusion event targets any of the vulnerabilities detected in the first zone or the second zone.

16. The system of claim 15, wherein the one or more inputs to the graphical user interface place one or more of the first set of active vulnerability scanners or the second set of active vulnerability scanners behind a firewall in the network to scan one or more targets located behind the firewall.

17. The system of claim 16, wherein the vulnerability management system is further configured to instruct the set of active vulnerability scanners placed behind the firewall to scan one or more targets located outside the firewall to assess one or more policies associated with the firewall.

18. The system of claim 15, wherein the vulnerability management system correlates the detected intrusion event with the one or more vulnerabilities detected in the first zone and the one or more vulnerabilities detected in the second zone using Bayesian pattern matching.

19. The system of claim 15, wherein the vulnerability management system is further configured to transmit an electronic message to at least one entity in the network in response to determining that the detected intrusion event targets any of the vulnerabilities detected in the first zone or the second zone.

20. The system of claim 15, wherein the vulnerability management system is further configured to:
   receive an indication that at least one of the vulnerabilities detected in the first zone or the second zone has been removed; and
   update the model of the network to remove the at least one vulnerability in response to receiving the indication that the at least one vulnerability has been removed.

21. The system of claim 20, wherein the indication includes information describing an action taken to remove the at least one vulnerability.

22. The system of claim 20, wherein the vulnerability management system is further configured to transmit an electronic message to at least one entity in the network, wherein the electronic message includes a recommendation for removing or mitigating the at least one vulnerability.

23. The system of claim 15, wherein the first set of active vulnerability scanners are further configured to discover one or more systems present in the first zone from the observed responses, and wherein the second set of active vulnerability scanners are further configured to discover one or more systems present in the second zone from the observed responses.

24. The system of claim 23, wherein the first set of active vulnerability scanners are further configured to discover one or more services running on the systems discovered in the first zone from the observed responses, and wherein the second set of active vulnerability scanners are further configured to discover one or more services running on the systems discovered in the second zone from the observed responses.

25. The system of claim 24, wherein at least one of the vulnerabilities detected in the first zone or the vulnerabilities detected in the second zone comprises a vulnerability associated with one or more of the services discovered in the first zone or services discovered in the second zone.

26. The system of claim 15, wherein one or more of the first set of active vulnerability scanners or the second set of active vulnerability scanners are distributed outside a firewall in the network to scan one or more targets located outside the firewall.

27. The system of claim 15, wherein the first set of active vulnerability scanners and the second set of the active vulnerability scanners are distributed outside a firewall in the network to scan targets located outside the firewall, and wherein the one or more passive vulnerability scanners are distributed inside the firewall to sniff the plurality of packets inside the network.

28. The system of claim 15, wherein the model of the network assigns weights to the one or more vulnerabilities detected in the first zone and further assigns weights to the one or more vulnerabilities detected in the second zone.

29. The system of claim 28, wherein the weights include one point for any of the detected vulnerabilities that are informational, three points for any of the detected vulnerabilities that are warnings, and ten points for any of the detected vulnerabilities that are actual holes.

30. A method for detecting one or more vulnerabilities in a network, comprising:
   distributing a plurality of active vulnerability scanners on a network having a plurality of zones defined in one or more inputs to a graphical user interface, wherein the one or more inputs to the graphical user interface specify a first IP address range to define a first one of the plurality of zones, a first set of IP addresses and listening ports for a first subset of the plurality of active vulnerability scanners to place the first subset of the plurality of active vulnerability scanners in the first zone, a second IP address range to define a second one of the plurality of zones, and a second set of IP addresses and listening ports for a second subset of the plurality of active vulnerability scanners to place the second subset of the plurality of active vulnerability scanners in the second zone;
   scanning the plurality of zones in the network with the plurality of active vulnerability scanners, wherein scanning the plurality of zones in the network with the plurality of active vulnerability scanners includes:
      actively scanning the first zone in the network with the first subset of the plurality of active vulnerability scanners, wherein scanning the first zone in the network with the first subset of the plurality of active vulnerability scanners includes the first subset of the plurality of active vulnerability scanners evenly dividing work associated with actively scanning the first zone in the network, sending packets to one or more network components in the first zone, observing responses to the packets from the one or more network components, and detecting one or more vulnerabilities in the first zone from the observed responses; and
      actively scanning the second zone in the network with the second subset of the plurality of active vulnerability scanners, wherein scanning the second zone in the network with the second subset of the plurality of active vulnerability scanners includes the second subset of the plurality of active vulnerability scanners evenly dividing work associated with actively scanning the second zone in the network, sending packets to one or more network components in the second zone, observing responses to the packets from the one or more network components, and detecting one or more vulnerabilities in the second zone from the observed responses;
   forwarding results from scanning the plurality of zones in the network with the plurality of active vulnerability scanners to a vulnerability management system, wherein the scanning results forwarded from the plurality of active vulnerability scanners include information describing the one or more vulnerabilities detected in the first zone and the one or more vulnerabilities detected in the second zone;
   building a model of the network from the scanning results forwarded to the vulnerability management system, wherein the model of the network maps the one or more vulnerabilities detected in the first zone and the one or more vulnerabilities detected in the second zone;
   sniffing, with one or more passive vulnerability scanners further distributed on the network, a plurality of packets observed in traffic traveling across the network, wherein the one or more passive vulnerability scanners detect an intrusion event in the network from information in the plurality of sniffed packets; and
   correlating the detected intrusion event with the one or more vulnerabilities detected in the first zone and the one or more vulnerabilities detected in the second zone to determine whether the detected intrusion event targets any of the vulnerabilities detected in the first zone or the second zone.

31. The method of claim 2, further comprising assessing one or more policies associated with the firewall, wherein assessing the one or more policies associated with the firewall includes the vulnerability management system instructing the subset of the plurality of active vulnerability scanners placed behind the firewall to scan one or more targets located outside the firewall.

32. A method for detecting one or more vulnerabilities in a network, comprising:
- distributing a plurality of active vulnerability scanners on a network having a plurality of zones defined in one or more inputs to a graphical user interface, wherein the one or more inputs to the graphical user interface place a first subset of the plurality of active vulnerability scanners in a first one of the plurality of zones, and wherein the one or more inputs to the graphical user interface further place a second subset of the plurality of active vulnerability scanners in a second one of the plurality of zones;
- scanning the plurality of zones in the network with the plurality of active vulnerability scanners, wherein the first zone contains the second zone, and wherein scanning the plurality of zones in the network with the plurality of active vulnerability scanners includes:
  - actively scanning the first zone in the network with the first subset of the plurality of active vulnerability scanners, wherein scanning the first zone in the network with the first subset of the plurality of active vulnerability scanners includes the first subset of the plurality of active vulnerability scanners sending packets to one or more network components in the first zone, observing responses to the packets from the one or more network components, and detecting one or more vulnerabilities in the first zone from the observed responses, and wherein the first subset of the plurality of active vulnerability scanners:
    - only scan portions of the first zone located outside the second zone, or
    - scan portions of the first zone located inside the second zone in response to the one or more inputs to the graphical user interface including an override for a default scan source associated with the first subset of the plurality of active vulnerability scanners;
  - actively scanning the second zone in the network with the second subset of the plurality of active vulnerability scanners, wherein scanning the second zone in the network with the second subset of the plurality of active vulnerability scanners includes the second subset of the plurality of active vulnerability scanners sending packets to one or more network components in the second zone, observing responses to the packets from the one or more network components, and detecting one or more vulnerabilities in the second zone from the observed responses;
- forwarding results from scanning the plurality of zones in the network with the plurality of active vulnerability scanners to a vulnerability management system, wherein the scanning results forwarded from the plurality of active vulnerability scanners include information describing the one or more vulnerabilities detected in the first zone and the one or more vulnerabilities detected in the second zone;
- building a model of the network from the scanning results forwarded to the vulnerability management system, wherein the model of the network maps the one or more vulnerabilities detected in the first zone and the one or more vulnerabilities detected in the second zone;
- sniffing, with one or more passive vulnerability scanners further distributed on the network, a plurality of packets observed in traffic traveling across the network, wherein the one or more passive vulnerability scanners detect an intrusion event in the network from information in the plurality of sniffed packets; and
- correlating the detected intrusion event with the one or more vulnerabilities detected in the first zone and the one or more vulnerabilities detected in the second zone to determine whether the detected intrusion event targets any of the vulnerabilities detected in the first zone or the second zone.

33. A system for detecting vulnerabilities in a network, comprising:
- a network having a plurality of zones, wherein one or more inputs to a graphical user interface define the plurality of zones in the network;
- a first set of active vulnerability scanners distributed in a first one of the plurality of zones in the network, wherein the one or more inputs to the graphical user interface specify a first IP address range to define the first zone in the network and a first set of IP addresses and listening ports for the first set of active vulnerability scanners to place the first set of active vulnerability scanners in the first zone, and wherein the first set of active vulnerability scanners are configured to evenly divide work associated with actively scanning the first zone in the network, send packets to one or more network components in the first zone to actively scan the first zone, observe responses to the packets from the one or more network components in the first zone, and detect one or more vulnerabilities in the first zone from the observed responses;
- a second set of active vulnerability scanners distributed in a second one of the plurality of zones in the network, wherein the one or more inputs to the graphical user interface specify a second IP address range to define the second zone and a second set of IP addresses and listening ports for the second set of active vulnerability scanners to place the second set of active vulnerability scanners in the second zone, and wherein the second set of active vulnerability scanners are configured to evenly divide work associated with actively scanning the second zone in the network, send packets to one or more network components in the second zone to actively scan the second zone, observe responses to the packets from the one or more network components in the second zone, and detect one or more vulnerabilities in the second zone from the observed responses;
- one or more passive vulnerability scanners configured to sniff a plurality of packets observed in traffic traveling across the network, wherein the one or more passive vulnerability scanners detect an intrusion event in the network from the information in the plurality of sniffed packets; and
- a vulnerability management system, including a processor, that receives results from the first set of active vulnerability scanners scanning the first zone and the second set of active vulnerability scanners scanning the second zone, wherein the scanning results received from the first set of active vulnerability scanners and the second set of active vulnerability scanners include information describing the one or more vulnerabilities detected in the first zone and the one or more vulnerabilities detected in the second zone, and wherein the vulnerability management system is configured to:
build a model of the network from the scanning results received at the vulnerability management system, wherein the model of the network maps the one or more vulnerabilities detected in the first zone and the one or more vulnerabilities detected in the second zone; and
correlate the detected intrusion event with the one or more vulnerabilities detected in the first zone and the one or more vulnerabilities detected in the second zone to determine whether the detected intrusion event targets any of the vulnerabilities detected in the first zone or the second zone.

34. A system for detecting vulnerabilities in a network, comprising:
a network having a plurality of zones that include a first zone and a second zone, wherein one or more inputs to a graphical user interface define the plurality of zones in the network such that the first zone contains the second zone;
a first set of active vulnerability scanners distributed in the first zone and configured to send packets to one or more network components in the first zone to actively scan the first zone, observe responses to the packets from the one or more network components in the first zone, and detect one or more vulnerabilities in the first zone from the observed responses, wherein the one or more inputs to the graphical user interface place the first set of active vulnerability scanners in the first zone, and wherein the first set of active vulnerability scanners:
only scan portions of the first zone located outside the second zone, or
scan portions of the first zone located inside the second zone in response to the one or more inputs to the graphical user interface including an override for a default scan source associated with the first set of active vulnerability scanners;
a second set of active vulnerability scanners distributed in the second zone and configured to send packets to one or more network components in the second zone to actively scan the second zone, observe responses to the packets from the one or more network components in the second zone, and detect one or more vulnerabilities in the second zone from the observed responses, wherein the one or more inputs to the graphical user interface further place the second set of active vulnerability scanners in the second zone;
one or more passive vulnerability scanners configured to sniff a plurality of packets observed in traffic traveling across the network, wherein the one or more passive vulnerability scanners detect an intrusion event in the network from the information in the plurality of sniffed packets; and
a vulnerability management system that receives results from the first set of active vulnerability scanners scanning the first zone and the second set of active vulnerability scanners scanning the second zone, wherein the scanning results received from the first set of active vulnerability scanners and the second set of active vulnerability scanners include information describing the one or more vulnerabilities detected in the first zone and the one or more vulnerabilities detected in the second zone, and wherein the vulnerability management system is configured to:
build a model of the network from the scanning results received at the vulnerability management system, wherein the model of the network maps the one or more vulnerabilities detected in the first zone and the one or more vulnerabilities detected in the second zone; and
correlate the detected intrusion event with the one or more vulnerabilities detected in the first zone and the one or more vulnerabilities detected in the second zone to determine whether the detected intrusion event targets any of the vulnerabilities detected in the first zone or the second zone.

35. A system for detecting vulnerabilities in a network, comprising:
a network having a plurality of zones, wherein one or more inputs to a graphical user interface define the plurality of zones in the network;
a first set of active vulnerability scanners distributed in a first one of the plurality of zones in the network, wherein the one or more inputs to the graphical user interface place the first set of active vulnerability scanners in the first zone, and wherein the first set of active vulnerability scanners are configured to send packets to one or more network components in the first zone to actively scan the first zone, observe responses to the packets from the one or more network components in the first zone, and detect one or more vulnerabilities in the first zone from the observed responses;
a second set of active vulnerability scanners distributed in a second one of the plurality of zones in the network, wherein the one or, more inputs to the graphical user interface further place the second set of active vulnerability scanners in the second zone, and wherein the second set of active vulnerability scanners are configured to send packets to one or more network components in the second zone to actively scan the second zone, observe responses to the packets from the one or more network components in the second zone, and detect one or more vulnerabilities in the second zone from the observed responses;
one or more passive vulnerability scanners configured to sniff a plurality of packets observed in traffic traveling across the network, wherein the one or more passive vulnerability scanners detect an intrusion event in the network in response to applying one or more signatures to information in the plurality of sniffed packets and recognizing one or more vulnerable service banners in at least one of the plurality of packets using the applied signatures, and wherein the one or more signatures include:
one or more patterns that the passive vulnerability scanners apply to the information in the plurality of sniffed packets,
one or more regular expressions the passive vulnerability scanners apply to the information in the plurality of sniffed packets in response to the information in the plurality of sniffed packets matching the one or more patterns, and
one or more macros that instruct the passive vulnerability scanners to store an evaluation from applying the one or more regular expressions to the information in the plurality of sniffed packets, and
a vulnerability management system, including a processor, that receives results from the first set of active vulnerability scanners scanning the first zone and the second set of active vulnerability scanners scanning the second zone, wherein the scanning results received from the first set of active vulnerability scanners and the second set of active vulnerability scanners include information describing the one or more vulnerabilities detected in the first zone and the one or more vulnerabilities detected in the second zone, and wherein the vulnerability management system is configured to:

build a model of the network from the scanning results received at the vulnerability management system, wherein the model of the network maps the one or more vulnerabilities detected in the first zone and the one or more vulnerabilities detected in the second zone; and correlate the detected intrusion event with the one or more vulnerabilities detected in the first zone and the one or more vulnerabilities detected in the second zone to determine whether the detected intrusion event targets any of the vulnerabilities detected in the first zone or the second zone.

36. The system of claim 35, wherein the one or more passive vulnerability scanners apply the one or more patterns to the information in consecutive packets within the plurality of sniffed packets.

37. The system of claim 35, wherein the one or more patterns include one or more of a binary pattern providing a string that the one or more passive vulnerability scanners apply to the information in the plurality of sniffed packets.

38. The system of claim 35, wherein the one or more patterns include a time dependent pattern having a first pattern that the one or more passive vulnerability scanners apply to the information in the plurality of sniffed packets and a second pattern that the one or more passive vulnerability scanners apply to the information in the plurality of sniffed packets in response to determining that the information in the plurality of sniffed packets matches the first pattern in accordance with a predetermined time dependency.

39. A method for detecting one or more vulnerabilities in a network, comprising:

distributing a plurality of active vulnerability scanners on a network having a plurality of zones defined in one or more inputs to a graphical user interface, wherein the one or more inputs to the graphical user interface place a first subset of the plurality of active vulnerability scanners in a first one of the plurality of zones, and wherein the one or more inputs to the graphical user interface further place a second subset of the plurality of active vulnerability scanners in a second one of the plurality of zones;

scanning the plurality of zones in the network with the plurality of active vulnerability scanners, wherein scanning the plurality of zones in the network with the plurality of active vulnerability scanners includes:

actively scanning the first zone in the network with the first subset of the plurality of active vulnerability scanners, wherein scanning the first zone in the network with the first subset of the plurality of active vulnerability scanners includes the first subset of the plurality of active vulnerability scanners sending packets to one or more network components in the first zone, observing responses to the packets from the one or more network components, and detecting one or more vulnerabilities in the first zone from the observed responses; and actively scanning the second zone in the network with the second subset of the plurality of active vulnerability scanners, wherein scanning the second zone in the network with the second subset of the plurality of active vulnerability scanners includes the second subset of the plurality of active vulnerability scanners sending packets to one or more network components in the second zone, observing responses to the packets from the one or more network components, and detecting one or more vulnerabilities in the second zone from the observed responses;

forwarding results from scanning the plurality of zones in the network with the plurality of active vulnerability scanners to a vulnerability management system, wherein the scanning results forwarded from the plurality of active vulnerability scanners include information describing the one or more vulnerabilities detected in the first zone and the one or more vulnerabilities detected in the second zone;

building a model of the network from the scanning results forwarded to the vulnerability management system, wherein the model of the network maps the one or more vulnerabilities detected in the first zone and the one or more vulnerabilities detected in the second zone;

sniffing, with one or more passive vulnerability scanners further distributed on the network, a plurality of packets observed in traffic traveling across the network, wherein the one or more passive vulnerability scanners detect an intrusion event in the network in response to applying one or more signatures to information in the plurality of sniffed packets and recognizing one or more vulnerable service banners in at least one of the plurality of packets using the applied signatures, and wherein the one or more signatures include:

one or more patterns that the passive vulnerability scanners apply to the information in the plurality of sniffed packets, one or more regular expressions the passive vulnerability scanners apply to the information in the plurality of sniffed packets in response to the information in the plurality of sniffed packets matching the one or more patterns, and one or more macros that instruct the passive vulnerability scanners to store an evaluation from applying the one or more regular expressions to the information in the plurality of sniffed packets; and correlating the detected intrusion event with the one or more vulnerabilities detected in the first zone and the one or more vulnerabilities detected in the second zone to determine whether the detected intrusion event targets any of the vulnerabilities detected in the first zone or the second zone.

40. The method of claim 39, wherein the one or more passive vulnerability scanners apply the one or more patterns to the information in consecutive packets within the plurality of sniffed packets.

41. The method of claim 39, wherein the one or more patterns include one or more of a binary pattern providing a string that the one or more passive vulnerability scanners apply to the information in the plurality of sniffed packets.

42. The method of claim 39, wherein the one or more patterns include a time dependent pattern having a first pattern that the one or more passive vulnerability scanners apply to the information in the plurality of sniffed packets and a second pattern that the one or more passive vulnerability scanners apply to the information in the plurality of sniffed packets in response to determining that the information in the plurality of sniffed packets matches the first pattern in accordance with a predetermined time dependency.

* * * * *